United States Patent
Dollase et al.

(10) Patent No.: US 11,680,192 B2
(45) Date of Patent: Jun. 20, 2023

(54) FUNCTIONALIZED (CO)POLYMERS FOR ADHESIVE SYSTEMS

(71) Applicant: TESA SE, Norderstedt (DE)

(72) Inventors: Thilo Dollase, Hamburg (DE); Markus Brodbeck, Stuttgart (DE); Alexander Fischer, Hamburg (DE); Marco Kupsky, Quickborn (DE); Alexander Prenzel, Hamburg (DE)

(73) Assignee: TESA SE, Norderstedt (DE)

( * ) Notice: Subject to any disclaimer, the term of this patent is extended or adjusted under 35 U.S.C. 154(b) by 677 days.

(21) Appl. No.: 16/097,109

(22) PCT Filed: Apr. 6, 2017

(86) PCT No.: PCT/EP2017/058295
§ 371 (c)(1),
(2) Date: Oct. 26, 2018

(87) PCT Pub. No.: WO2017/190911
PCT Pub. Date: Nov. 9, 2017

(65) Prior Publication Data
US 2021/0222037 A1      Jul. 22, 2021

(30) Foreign Application Priority Data

May 2, 2016   (DE) ..................... 10 2016 207 550.0

(51) Int. Cl.
*C09J 133/06*   (2006.01)
*C08F 220/32*   (2006.01)
(Continued)

(52) U.S. Cl.
CPC ....... *C09J 133/068* (2013.01); *C08F 220/325* (2020.02); *C09J 7/385* (2018.01);
(Continued)

(58) Field of Classification Search
CPC ... B32B 7/12; B32B 2333/08; B32B 2333/12; B32B 2405/00; C08F 220/325;
(Continued)

(56) References Cited

U.S. PATENT DOCUMENTS

| | | |
|---|---|---|
| 3,729,313 A | 4/1973 | Smith |
| 3,741,769 A | 6/1973 | Smith |

(Continued)

FOREIGN PATENT DOCUMENTS

| | | |
|---|---|---|
| CN | 1235615 A | 11/1999 |
| CN | 1989167 A | 6/2007 |

(Continued)

OTHER PUBLICATIONS

German Search Report for corresponding application DE 10 2016 207 550.0 dated Dec. 8, 2016.
(Continued)

*Primary Examiner* — Eli D. Strah
(74) *Attorney, Agent, or Firm* — Norris McLaughlin PA

(57) ABSTRACT

The invention relates to a polymer obtainable by the radical polymerization of at least one monomer, namely one or more (meth)acrylate monomers and optionally, in addition, vinylic comonomers, wherein the polymer has a molar mass $M_W$ of at least 5,000 g/mol and at most 200,000 g/mol and at least one of the monomers is functionalized with at least one epoxy group, wherein the proportion of the epoxide-functionalized monomer(s) (a) is more than 30 wt %.

19 Claims, 2 Drawing Sheets

(51) Int. Cl.
*C09J 7/38* (2018.01)
*C09J 7/30* (2018.01)
*B32B 7/12* (2006.01)
*C09J 133/08* (2006.01)
*C09J 133/10* (2006.01)
*C09J 133/12* (2006.01)

(52) U.S. Cl.
CPC ............. *B32B 7/12* (2013.01); *B32B 2333/08* (2013.01); *B32B 2333/12* (2013.01); *B32B 2405/00* (2013.01); *C09J 7/30* (2018.01); *C09J 133/08* (2013.01); *C09J 133/10* (2013.01); *C09J 133/12* (2013.01); *C09J 2433/00* (2013.01)

(58) Field of Classification Search
CPC ......... C08F 220/32; C08F 120/32; C09J 7/30; C09J 7/385; C09J 133/068; C09J 133/08; C09J 133/10; C09J 133/12; C09J 2433/00; C08L 75/04
See application file for complete search history.

(56) References Cited

U.S. PATENT DOCUMENTS

| | | | |
|---|---|---|---|
| 4,058,401 A | 11/1977 | Crivello | |
| 4,138,255 A | 2/1979 | Crivello | |
| 4,231,951 A | 11/1980 | Smith et al. | |
| 4,250,053 A | 2/1981 | Smith | |
| 4,256,828 A | 3/1981 | Smith | |
| 4,394,403 A | 7/1983 | Smith | |
| 4,552,604 A | 11/1985 | Green | |
| 5,242,715 A | 9/1993 | Schoen et al. | |
| 5,344,890 A | 9/1994 | Miyazono et al. | |
| 5,789,487 A | 8/1998 | Matyjaszewski et al. | |
| 5,854,364 A | 12/1998 | Senninger et al. | |
| 5,945,491 A | 8/1999 | Matyjaszewski et al. | |
| 6,319,603 B1* | 11/2001 | Komiya | C08F 265/06 428/378 |
| 6,908,722 B2 | 6/2005 | Ebata et al. | |
| 10,808,153 B2* | 10/2020 | Dollase | C08K 5/17 |
| 2001/0031837 A1* | 10/2001 | Perez | C09D 153/00 525/384 |
| 2002/0185222 A1 | 12/2002 | Wigdorski et al. | |
| 2006/0024521 A1* | 2/2006 | Everaerts | C09J 153/00 428/522 |
| 2007/0041698 A1 | 2/2007 | Maeda et al. | |
| 2009/0171021 A1 | 7/2009 | Sato | |
| 2010/0063221 A1 | 3/2010 | Manabe et al. | |
| 2010/0210801 A1 | 8/2010 | Nijukken et al. | |
| 2011/0177302 A1 | 7/2011 | Takita | |
| 2012/0094119 A1* | 4/2012 | Fujita | C08F 265/06 522/111 |
| 2013/0345358 A1 | 12/2013 | Findlay et al. | |
| 2014/0367670 A1 | 12/2014 | Yamamoto et al. | |
| 2016/0083629 A1* | 3/2016 | Wang | C08L 33/08 522/74 |
| 2020/0377766 A1* | 12/2020 | Dollase | C09J 133/068 |

FOREIGN PATENT DOCUMENTS

| | | |
|---|---|---|
| CN | 105492973 A | 4/2016 |
| DE | 19519499 A1 | 11/1996 |
| DE | 69125454 T2 | 11/1997 |
| DE | 19949352 A1 | 4/2000 |
| EP | 0393893 A1 | 10/1990 |
| EP | 0542273 A1 | 5/1993 |
| EP | 0620259 A2 | 10/1994 |
| EP | 0721975 A1 | 7/1996 |
| EP | 0542716 B1 | 6/1997 |
| EP | 0819746 A2 | 1/1998 |
| EP | 0914027 A1 | 5/1999 |
| EP | 1028151 A1 | 8/2000 |
| EP | 0894841 B1 | 5/2003 |
| EP | 1308492 B1 | 9/2005 |
| EP | 2261737 A1 | 12/2010 |
| EP | 2545132 B2 | 1/2013 |
| EP | 30404777 A1 | 7/2016 |
| JP | 2009292992 A | 12/2009 |
| JP | 2012056915 A | 3/2012 |
| JP | WO2012165259 A1 | 2/2015 |
| TW | 201426190 A | 7/2014 |
| WO | 9624620 A1 | 8/1996 |
| WO | 9801478 A1 | 1/1998 |
| WO | 9821287 A1 | 5/1998 |
| WO | 9844008 A1 | 10/1998 |
| WO | 9931144 A1 | 6/1999 |
| WO | 9957216 A1 | 11/1999 |
| WO | 2013101693 A1 | 7/2013 |
| WO | 2013156509 A2 | 10/2013 |
| WO | 2015030060 A1 | 3/2015 |
| WO | 2015048012 A1 | 4/2015 |
| WO | 2015082143 A1 | 6/2015 |

OTHER PUBLICATIONS

International Search Report for corresponding application PCT/EP2017/058295 dated Jun. 19, 2017.
CN Office Action for corresponding application CN 201780034325.3 dated Jul. 2, 2020.

\* cited by examiner

FUNCTIONALIZED (CO)POLYMERS FOR ADHESIVE SYSTEMS

This is an application filed under 35 USC 371 based on PCT/EP2017/058296, filed 6 Apr. 2017, which in turn is based on DE 10 2016 207 550.0 filed 2 May 2016. The present application claims the full priority benefit of these prior applications and herein incorporates by reference the full disclosures of these prior applications.

The invention relates to epoxy-functionalized poly(meth)acrylates that are employable especially for use as, or as a component for, adhesive compositions.

BACKGROUND

Adhesive tapes are nowadays used in various forms as an auxiliary in processes and for bonding of various objects. Self-adhesive tapes comprising pressure-sensitive adhesive compositions have permanent tack. They can fulfill their bonding task without further curing, typically immediately after bonding. Self-adhesive tapes of this kind can sometimes achieve very high bond strengths. Nevertheless, there is the need in particular applications for adhesive solutions that permit even higher bond strengths. Many adhesive systems of this kind are applied in a hot compression step. In that case, they melt, wet the bond substrate and build up strength by solidification during cooling. Such adhesive systems may additionally have also chemical reactivity. Some hot-compressible adhesive systems that are employed in adhesive tape form, under hot-pressing conditions, show unwanted squeezing-out ("oozing") since the melt viscosity falls with temperature or the adhesive system becomes free-flowing as a result of temperature-related loss of cohesion. In the case of liquid adhesive systems, the problem of squeezing-out already occurs at room temperature. In the bonding process, by contrast, good adaptation characteristics to the substrates to be bonded are required in order to achieve an optimal contact surface of the adhesive layer. This entails a certain degree of flow characteristics of the adhesive system under compression conditions.

The term "squeezing-out" or else "oozing" (test A) in the context of this invention is understood to mean lateral escape of the uncured or insufficiently cured adhesive composition from an adhesive layer or adhesive bond. This can occur in the form of cold flow and/or under pressure and/or at elevated temperature and is undesirable.

In the case of reactive adhesive tapes, there is the additional requirement that the adhesive systems can be processed rapidly with regard to the activation time for the initiation of the curing reaction. As well as the activation, the curing is also to proceed rapidly up to the desired degree of curing. A particularly advantageous reactive system in this context is based on epoxies.

Curable epoxy-based adhesive systems that are used in the form of adhesive tapes often contain a film former component, which may be a thermoplastic polymer, an elastomer or a thermoplastic elastomer, and a reactive component frequently consisting of a reactive resin, epoxy-based in these cases, and a hardener system (also referred to as activator system or initiator system). Examples are to be found in EP 1 028 151 B1 (poly(meth)acrylate/low molecular weight epoxy resin), EP 620 259 A1 (polyester/low molecular weight epoxy resin), EP 721 975 (polyolefin/low molecular weight epoxy resin) and DE 195 19 499 A1 (thermoplastic polyurethane/low molecular weight epoxy resin).

The term "curable polymer", "curable adhesive composition" or "curable adhesive system" in the context of this invention is understood to mean a polymer or formulation that contains functional groups that can take part in a reaction via action of a curing agent component in combination with elevated temperature and/or radiation (especially UV radiation) as additional stimulus, said reaction leading to an increase in molecular weight and/or crosslinking of the polymer or at least one formulation constituent.

The terms "hardener", "initiator", "activator" are used synonymously in the context of this invention. They describe substances or substance mixtures that can bring about a curing reaction involving epoxy functionalities in combination with elevated temperature and/or radiation (especially UV radiation).

Moreover, in the case of curable adhesive systems that are to be used in the form of reactive adhesive tapes, it is typically necessary to assure sufficient storage stability under storage conditions, such that the reactive adhesive tape can be transported and stored in an uncomplicated manner, before the actual reactivity then occurs/is to occur only in the activation step and under activation conditions. Without such latency, the practicability of said adhesive tapes is limited.

In these and other cases, especially cationically curing epoxy systems are suitable, and here in particular those based on (cyclo)aliphatic epoxides that react via activation by means of an acid-forming initiator either thermally ("thermal acid generator", TAG) and/or under action of ultraviolet radiation ("photo acid generator", PAG). (Cyclo)aliphatic epoxides can be more efficiently cured with these initiators than glycidyl ethers (J. V. Crivello, *J. Polym. Sci. A Polym. Chem.*, 1999, 37, 4241-54). For formulation based on (cyclo)aliphatic epoxides that are particularly suitable for activation of this kind, however, there is by no means such a wealth of different reactive resins available to the person skilled in the art as in the case of glycidyl ether-based reactive resins. The available reactive resins based on (cyclo)aliphatic epoxides are additionally of low molecular weight, which can lead to the problem of squeezing-out under hot compression conditions or, according to the formulation, to some degree even at room temperature, since the as yet unconverted reactive resins of low molecular weight function as plasticizers. What are therefore being sought are reactive resins for adhesive systems, especially for those in film form, that have the disadvantages described in reduced form, if at all.

STATE OF THE ART

WO 98/21287 A1 describes radiation-curable precursors for thermally curable adhesive systems comprising (a) a radiation-curable monomer/prepolymer syrup that should be regarded particularly as a poly(meth)acrylate component, (b) an epoxy resin component, (c) a photoinitiator component and (d) a nucleophilic thermal activator. Oligomeric and polymeric epoxides can be used as component (b). (Co)polymers functionalized with cycloaliphatic epoxides are not mentioned explicitly. Cycloaliphatic epoxides are even fundamentally described as being not very advantageous; see page 19 line 2 of the document in question. Curing by means of TAGs or PAGs is not envisaged.

U.S. Pat. No. 4,552,604 A is a further example of a "dual-cure" system in which a poly(meth)acrylate is formed by photopolymerization in the presence of an epoxy resin. The photopolymerization of the liquid composition is effected on a liner. The photopolymerized film is finally made to cure thermally for the bonding. The photopolymerization is utilized in order to form a polymeric matrix for the thermally curable epoxy component. There is no mention of curing with superacid-forming initiators.

EP 2 545 132 A1 discloses a photocurable pressure-sensitive adhesive based on a polyacrylate. The polyacrylate contains a small proportion of an epoxy-functionalized comonomer via which crosslinking of the pressure-sensitive adhesive is possible. The proportion of epoxy-functionalized comonomer is very small, and so it is not possible to use the copolymers described directly to obtain reactive adhesive tapes with bond strengths well above those of the pressure-sensitive adhesives.

EP 819 746 A1 describes curable adhesive films, the formulation of which comprises a polyacrylate of high molecular weight, a photopolymerizable epoxy component and a cationic photoinitiator. According to the description, the polyacrylate may likewise contain small proportions, for example about 2% of the copolymer, of epoxy groups. No specific selection is made with regard to the epoxy component.

EP 914 027 A1 likewise describes curable adhesive films that may contain a polyacrylate, an epoxy component and a latent hardener. The polyacrylate may contain small proportions of glycidyl (meth)acrylate.

WO 2013/101693 A1 discloses thermally curable adhesive films produced from an acrylate monomer mixture which is free-radically polymerized by means of photoinitiation, and an epoxy component. There is no mention of epoxy-functionalized (meth)acrylates.

WO 2015/048012 A1 describes a thermally curable pressure-sensitive adhesive system comprising a polymethacrylate component that can react with benzoxazines. For this purpose it may contain epoxy groups inter alia, preferably introduced into the polymer via glycidyl methacrylate as comonomer. The description includes glass transition temperatures that are calculated via the Fox equation (U. W. Gedde, Polymer Physics, 1999, Kluwer, Dordrecht, p. 70). The Fox equation permits a theoretical estimate of the glass transition temperature of a homogeneous mixture and utilizes the glass transition temperatures of the starting components of the mixture weighted by the respective proportion of these components in the mixture. The base data use therein are based on glass transition temperatures for hypothetical homopolymers of the corresponding comonomer. For this purpose, it is possible to use tabular values that are listed for homopolymers having very high molar masses, namely those in which there is no change in glass transition temperature with molecular weight. Said Fox equation should not be confused with the Fox-Flory relationship (equation G1) that describes the effect of the molar polymer mass on glass transition temperature. In the case of the polymers described in WO 2015/048012 A1, very high molecular weights can therefore be assumed, and the utilization of polymers with lower molecular weight was not considered.

WO 1999/057216 A1 discloses formulations comprising 20% to 80% by weight of ethylene-vinyl acetate copolymers and 20% to 80% by weight of an epoxy component that can also be a polymer. A specific example cited is a polymer containing glycidyl methacrylate. There is no mention of polymers based on (meth)acrylates substituted by (cyclo)aliphatic epoxide.

WO 2012/165259 A1 describes polymerizable liquid adhesive formulations that are made to cure by UV radiation. For this purpose, the formulations contain monomers that bear cycloaliphatic epoxy groups and (meth)acrylate groups. The formulations additionally contain firstly photoinitiators for the free-radical polymerization of the (meth)acrylate groups and secondly photoinitiators for the cationic polymerization of the epoxy groups. Irradiation then simultaneously initiates both reaction processes. The formulations have the disadvantages that are typical of liquid adhesive systems, such as odor and a propensity to be squeezed out on application. Moreover, the free-radical curing operation can be disadvantageous since this type of curing proceeds only during irradiation and the curing reaction via this mechanism does not reach adhesive in shadow regions.

Object

There is still a need for reactive resins for curable adhesive compositions, especially for reactive adhesive tapes, that can build up high bond strength via activation and have a minimum propensity to be squeezed out in the activation step, but at the same time, under compression conditions, nevertheless have very good adaptation characteristics and hence permit high bond strengths. In order to balance out these opposing demands in an optimal manner, what is therefore being sought is an adhesive system having particularly balanced viscoelastic characteristics.

Achievement of Object

Figure 1A:
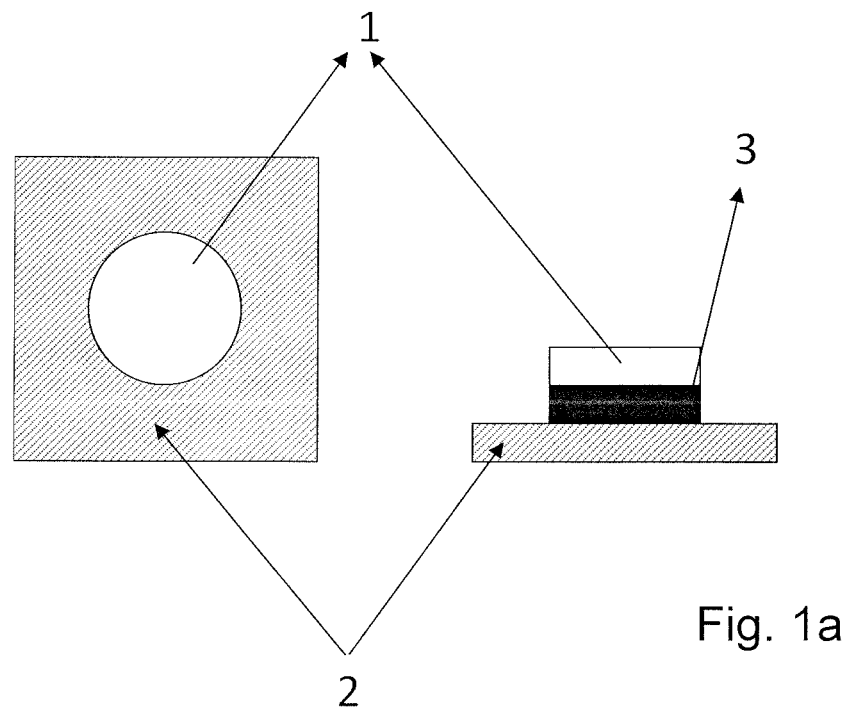
FIGS. 1a and 1b illustrate an apparatus used in evaluating the squeeze-out characteristics of the adhesive composition.

The object was achieved by reactive resins based on an epoxy-functionalized (co)polymer having a molar mass from a molar mass range of the invention above a minimum molar mass and below a maximum molar mass. The molar mass range of the invention above the minimum molar mass comprises that molar mass range in which the glass transition temperature of the uncured epoxy-functionalized (co)polymer depends on the molar mass. The dependence between polymer molar mass, M, and glass transition temperature, $T_G$, is known per se and is described as an approximation by the Fox-Flory relationship:

$$1/T_G = 1/T_G^\infty + \mathrm{const}/M \qquad (G1)$$

where $T_G^\infty$ is the glass transition temperature of a polymer at which $T_G$ ceases to change with molar mass, and const is a polymer type-dependent constant (T. Fox, P. J. Flory, *J. Polym. Sci.*, 1954, 14, 315-319). This is because it has been found that epoxy-functionalized (co)polymers in their uncured state, within this molar mass range, have excellent viscoelastic characteristics for a compression process or lead to excellent viscoelastic characteristics for a compression process in reactive adhesive formulations based thereon, specifically to a particularly advantageous balance of good adaptation characteristics and reduced squeeze-out characteristics if the compression temperature is above the glass transition temperature. The reactivity additionally permits very good bond strengths for the cured reactive adhesive composition. Since the glass transition temperature changes with molar mass within the molar mass range of the invention, there is a rise in the glass transition temperature during the curing reaction, which leads to a rise in internal strength of the reactive adhesive system and to bonding states having load-bearing capability.

The invention accordingly relates to epoxy-functionalized (co)polymers—especially those that are thermally and/or radiation-chemically curable—namely epoxy-functionalized (co)poly(meth)acrylates having a weight-average molar mass in the range from 5000 g/mol to 200 000 g/mol, based on more than 30% to 100% by weight, preferably 50% to 100% by weight, (based on the entirety of the parent monomers of the epoxy-functionalized (co)polymer) of at least one type of (meth)acrylic (co)monomer (a) functionalized with an epoxy group.

The polymer of the invention is thus one obtainable by free-radical polymerization of at least one monomer, namely one or more (meth)acrylate monomers and optionally additionally vinylic comonomers.

The molar mass figures relate to measurement by means of GPC by test method B.

In the context of this invention, the term "(co)polymer" is used collectively for homopolymers or copolymers. Where polymers are mentioned in the context of the document, this means (co)polymers unless otherwise apparent from the respective context.

The term "(co)poly(meth)acrylate" in the context of this invention is understood to mean polyacrylate and polymethacrylate homopolymers or copolymers composed of (meth)acrylic monomers and any other copolymerizable comonomers.

The term "(meth)acrylates" and the adjective "(meth)acrylic" refer collectively to the compounds from the group of acrylic acid derivatives—such as acrylic esters in particular—and methacrylic acid derivatives—such as methacrylic esters in particular.

In the context of this invention, "(co)polymerizable" relates to the ability of one type of monomer or of a mixture of at least two types of monomer to form a (co)polymer by molecular weight-increasing reaction.

In a preferred manner, the weight-average molar mass of the (co)monomer (a) functionalized with at least one group of an epoxide is at least 10 000 g/mol, very preferably at least 20 000 g/mol. Further preferably, the weight-average molar mass of the (co)monomer (a) functionalized with at least one group of an epoxide is at most 150 000 g/mol, very preferably at most 100 000 g/mol.

In accordance with the proportion in the entirety of the parent monomers of the epoxy-functionalized (co)polymer, the (meth)acrylic (co)monomers (A) functionalized with an epoxy group have a (co)monomer content in the epoxy-functionalized (co)polymer of more than 30% by weight to 100% by weight, preferably of at least 50% by weight.

In a very preferred manner, the (meth)acrylic (co)monomer (a) functionalized with an epoxy group used is a cycloaliphatic epoxide, or, when two or more (meth)acrylic (co)monomers (a) functionalized with an epoxy group are present, cycloaliphatic epoxides are used for one, more than one or all these (meth)acrylic (co)monomers (a) functionalized with an epoxy group. Especially advantageously, cycloaliphatic epoxides are used for more than 50% by weight of the (co)monomers (a); more preferably, exclusively cycloaliphatic epoxides are used for the (co)monomers (a).

The at least one type of epoxy-functionalized (co)polymer may optionally comprise units derivable from the following monomers (in which case at least a copolymer is present), where each of the monomer types (b), (c) and (d) mentioned hereinafter may be present irrespective of the presence of the respective other types of monomer:

(b) one or more types of comonomer having a glass transition temperature of at least 25° C., especially at least 50° C., with a comonomer content in the copolymer of 0% by weight to less than 70% by weight, preferably to at most 50% by weight, and/or (c) one or more types of comonomer having a glass transition temperature of below 25° C., especially at most 0° C., with a comonomer content in the copolymer of 0% by weight to less than 70% by weight, preferably to at most 50% by weight, and/or (d) one or more types of comonomer that bear at least one functionality other than an epoxy group, especially a silicon-containing group, with a comonomer content in the copolymer of 0% by weight to 10% by weight, preferably to 5% by weight.

Monomer content or (co)monomer content in the (co)polymer in the context of this document refers to the proportion of the repeat units (building blocks) attributable to these (co)monomers in the (co)polymer in question. The monomer contents in the polymer mixture to be polymerized for the preparation of the corresponding copolymer are advantageously chosen accordingly. Glass transition temperature figures in this document relate to measurement by means of DSC by method C.

The glass transition temperature of the epoxy-functionalized (co)polymer is preferably at least 0° C., very preferably at least 25° C., even more preferably at least 35° C. It is preferably at most 100° C., more preferably at most 80° C. In an alternative execution of the invention, the glass transition temperature of the functionalized (co)polymer (A) may also be below 0° C.

In the case of use as an adhesive system or in an adhesive system, the adhesive system softens on application with heating and compression, its wetting characteristics increase, and as a result it can form contact with the substrates to be bonded. In this connection, the molar mass of the inventive epoxy-functionalized (co)polymer is of central significance, since, for a given composition, it affects the viscoelastic properties of the melt and here especially the melt viscosity. The higher the molar mass, the more marked the effect of entanglements as temporary crosslinking points on the viscoelastic characteristics. If the molar mass of the inventive functionalized (co)polymer is below that of its entangled molecular weight, corresponding polymers are very free-flowing and under compression conditions, i.e. above the glass transition temperature, and harbor the risk of significant squeezing-out. If the molar mass, by contrast, is too high, namely within the molar mass range in which the glass transition temperature no longer changes with molar mass, the polymer is already too significantly entangled, which reduces the flow characteristics such that good adaptation is no longer assured under compression conditions.

The inventive epoxy-functionalized (co)polymer additionally offers a further advantage. This is because the invention makes use of the finding that a reactive system, in the bonding step in which squeezing-out can occur, undergoes an increase in molecular weight through activation by elevated temperature and/or (UV) radiation. Two processes take place here: chain growth and crosslinking. Both processes are kinetically controlled and require time. If heat is used under bonding conditions, the viscosity of the system is reduced in accordance with its temperature dependence, which can lead to squeezing-out. If the molecular weight is not increased rapidly enough, as a result of the molar mass dependence of the viscosity, which in principle counteracts the temperature dependence of the viscosity, it cannot compensate for the drop in viscosity caused by introduction of heat. The consequence is unwanted squeezing-out of adhesive material and an imperfect bonding result.

However, inventive polymers already have a base molar mass, and so the chain growth step already proceeds prior to the activation, and only crosslinking needs to proceed to build up cohesion.

(Co)monomers

The following (co)monomers of types (a), (b), (c) and (d) are advantageous in the context of this invention:

(Co)monomers (a)

Monomers used for the (co)monomers (a) are those of the formula (I)

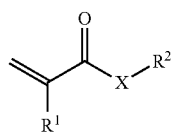

where —$R^1$ is —H or —$CH_3$, —X— is —$N(R^3)$— or —O—, —$R^3$ is —H or —$CH_3$ and —$R^2$ is an epoxy-functionalized (hetero)hydrocarbyl group.

Further preferably, the $R^2$ group includes linear, branched, cyclic or polycyclic hydrocarbyl radicals which have 2 to 30 carbon atoms and have been functionalized with an epoxy group. Particularly preferred representatives of this group are 3,4-epoxycyclohexyl-substituted monomers, for example 3,4-epoxycyclohexylmethyl methacrylate, 3,4-epoxycyclohexylmethyl acrylate, 3,4-epoxycyclohexyl methacrylate, 3,4-epoxycyclohexyl acrylate.

Less preferred co(monomers) (a) that are nevertheless encompassed by the invention are (co)monomers containing glycidyl groups, such as glycidyl acrylate or glycidyl methacrylate. However, the curing properties of the oxirane units in glycidyl groups differ from those of (cyclo)aliphatic epoxides especially in the case of cationic curing. Moreover, glycidyl ether-based systems usually contain residual halogen for reasons relating to the processes by which they are prepared. However, adhesive compositions based on epoxy-functionalized (co)polymers of the invention preferably have a very low halogen content (<1000 ppm, preferably even <100 ppm), especially based on chlorine and bromine.

The proportion of (co)monomers (a) can be used to adjust properties including mechanical properties of the (co)polymer, and the latter can also be used to adjust properties including the mechanical properties of a formulation containing these polymers, since the proportion of epoxy groups in the (co)polymer during the curing can be used to adjust the crosslinking density. Low proportions of (co)monomer (a) lead to less elastic adhesive layers, higher proportions to more marked elastic adhesive layers, each with respect to the viscoelastic properties.

The (co)monomers (a) can in principle be chosen freely with regard to their glass transition temperature, and are especially advantageously selected such that the glass transition temperature of the resulting (co)polymer, according to the desired properties—for instance pressure-sensitive adhesive or non-pressure-sensitively adhesive—is within the range correspondingly required (see also further down).

In an advantageous manner, the monomers (a) can be selected, for example, in such a way that it is true of the predominant number thereof, especially of all monomers (a), that the glass transition temperature of the hypothetical homopolymer formed from the respective monomer (what is meant in this connection is the glass transition temperature of the homopolymer of the corresponding monomers within the molar mass-independent glass transition temperature range, $T_G^\infty$) is at least 25° C., especially at least 50° C.

In another advantageous manner, the monomers (a) can be selected, for example, in such a way that it is true of the predominant number thereof, especially of all monomers (a), that the glass transition temperature of the hypothetical homopolymer formed from the respective monomer (what is meant in this connection is the glass transition temperature of the homopolymer of the corresponding monomers within the molar mass-independent glass transition temperature range, $T_G^\infty$) is below 25° C., especially below 0° C.

Comonomers (b)

Comonomers (b) especially have no epoxy groups. Usable comonomers within the scope of comonomers (b) are all (meth)acrylate monomers known to the person skilled in the art—especially those that are free of epoxy groups—and other copolymerizable vinyl monomers that are copolymerizable with (co)monomers (a) and optionally (c) and/or (d) and that have a glass transition temperature as hypothetical homopolymer (in this connection, this means the glass transition temperature of the homopolymer of the corresponding monomers within the molar mass-independent glass transition temperature range, $T_G^\infty$) of at least 25° C., especially at least 50° C. Monomers of this kind are also referred to as "hard monomers" in the context of this document. An example of a source that can be consulted for selection of such comonomers is the Polymer Handbook (J. Brandrup, E. H. Immergut, E. A. Grulke (eds.), 4th ed., 1999, J. Wiley, Hoboken, vol. 1, chapter VI/193). Also advantageously usable are what are called macromers according to WO 2015/082143 A1. Preference is given to comonomers which essentially, by virtue of their chemical design, prior to the initiation of the curing reaction, have no reactivity with the epoxy functionalities of the (co)monomers (a) or have an initiating or catalyzing effect in relation to any reaction of the epoxy functionalities, or their reactivity with epoxy functionalities is otherwise suppressed. The proportion of comonomers (b) can be used to adjust the adhesive and mechanical properties of the adhesive composition. They have a tendency to make the adhesive harder.

Comonomers (c)

Comonomers (c) especially have no epoxy groups. Usable comonomers within the scope of comonomers (c) are all (meth)acrylate monomers known to the person skilled in the art—especially those that are free of epoxy groups—and other copolymerizable vinyl monomers that are copolymerizable with (co)monomers (a) and any comonomers (b) and/or (d) present and that have a glass transition temperature as hypothetical homopolymer (in this connection, this means the glass transition temperature of the homopolymer of the corresponding monomers within the molar mass-independent glass transition temperature range, $T_G^\infty$) of below 25° C., especially at most 0° C. Monomers of this kind are also referred to as "soft monomers" in the context of this document. An example of a source that can be consulted for selection of such comonomers is the Polymer Handbook (J. Brandrup, E. H. Immergut, E. A. Grulke (eds.), 4th ed., 1999, J. Wiley, Hoboken, vol. 1, chapter VI/193). Also advantageously usable are what are called macromers according to WO 2015/082143 A1. Preference is given to comonomers which, by virtue of their chemical design, prior to the initiation of the curing reaction, have essentially no initiating or catalyzing action in relation to any reaction of the epoxy functionalities, and especially have no reactivity with the epoxy functionalities of the (co)monomers (a) and/or their reactivity with epoxy functionalities has been suppressed in some other way. The proportion of comonomers (c) can be used to adjust the adhesive and mechanical properties of the adhesive. They have a tendency to make the adhesive softer, and pressure-sensitive adhesiveness can be achieved.

Comonomers (d)

Monomers used within the scope of the comonomers (d) are in particular those that are copolymerizable with (co) monomers (a) and any comonomers (b) and/or (c) present and that optimize the adhesive properties of the copolymer of the invention. Particular mention should be made in this connection of silicon-containing comonomers and here of acrylated or methacrylated alkoxysilane-containing comonomers as advantageous comonomers. Examples are 3-(triethoxysilyl)propyl methacrylate, 3-(triethoxysilyl)propyl acrylate, 3-(trimethoxysilyl)propyl acrylate, 3-(trimethoxysilyl)propyl methacrylate, methacryloyloxymethyltriethoxysilane, (methacryloyloxymethyl)trimethoxysilane, (3-acryloyloxypropyl)methyldimethoxysilane, (methacryloyloxymethyl)methyldimethoxysilane, γ-methacryloyloxypropylmethyldimethoxysilane, methacryloyloxypropylmethyldiethoxysilane, 3-(dimethoxymethylsilyl)propyl methacrylate, methacryloyloxypropyldimethylethoxysilane, methacryloyloxypropyldimethylmethoxysilane. Among the aforementioned compounds, particular preference is given to 3-(triethoxysilyl)propyl methacrylate, 3-(triethoxysilyl)propyl acrylate, 3-(trimethoxysilyl)propyl acrylate and 3-(trimethoxysilyl)propyl methacrylate.

The comonomers (d) also preferably have no epoxy groups.

Preparation

The preparation of the epoxy-functionalized (co)polymers is effected by (co)polymerization of the parent (co)monomers and can be conducted in substance, in the presence of one or more organic solvents, in the presence of water or in mixtures of organic solvents and water. The aim here is to keep the amount of solvent used as small as possible. Suitable organic solvents are pure alkanes (for example hexane, heptane, octane, isooctane, isohexane, cyclohexane), aromatic hydrocarbons (for example benzene, toluene, xylene), esters (for example ethyl acetate, propyl, butyl or hexyl acetate), halogenated hydrocarbons (for example chlorobenzene), alkanols (for example methanol, ethanol, ethylene glycol, ethylene glycol monomethyl ether), ketones (for example acetone, butanone) and ethers (for example diethyl ether, dibutyl ether) or mixtures thereof. Compounds that can react with epoxy functionalities prior to the initiation of the curing reaction or can initiate or catalyze the reaction of epoxy functionalities, or their reactivity with epoxy functionalities is suppressed in some other way, are avoided.

The aqueous polymerization reactions can be admixed with a water-miscible or hydrophilic cosolvent in order to ensure that the reaction mixture is in the form of a homogeneous phase during the monomer conversion. Advantageously usable cosolvents for the present invention are chosen from the following group consisting of aliphatic alcohols, glycols, ethers, glycol ethers, polyethylene glycols, polypropylene glycols, esters, alcohol derivatives, hydroxy ether derivatives, ketones and the like, and derivatives and mixtures thereof. Compounds that can react with epoxy functionalities and/or can initiate or catalyze the reaction of epoxy functionalities and/or whose reactivity with epoxy functionalities is not suppressed in some other way are avoided.

The epoxy-functionalized (co)polymers of the invention are advantageously prepared using conventional free-radical polymerizations or controlled free-radical polymerizations. For the free-radical polymerizations, preference is given to using initiator systems that contain free-radical initiators for polymerization (polymerization initiators), especially free-radical-forming azo or peroxo initiators that undergo thermal breakdown. However, all polymerization initiators that are customary for acrylates and/or methacrylates and are familiar to the person skilled in the art are suitable. The production of C-centered radicals is described in Houben-Weyl, Methoden der Organischen Chemie, Vol. E 19a, p. 60-147. These methods are preferably employed analogously.

The free-radical polymerization initiators mentioned in connection with the preparation of the (co)polymers should not be confused with the activators used for the curing of the curable adhesive composition.

Examples of free-radical sources are peroxides, hydroperoxides and azo compounds. A few nonexclusive examples of typical free-radical initiators include potassium peroxodisulfate, dibenzoyl peroxide, cumene hydroperoxide, cyclohexanone peroxide, di-tert-butyl peroxide, azobisisobutyronitrile, cyclohexylsulfonyl acetyl peroxide, diisopropyl percarbonate, tert-butyl peroctoate, benzpinacol. Particular preference is given to using 2,2'-azobis(2-methylbutyronitrile) oder 2,2-azobis(2,4-dimethylvaleronitrile) as free-radical polymerization initiators.

The polymerization time is—according to temperature and desired conversion—between 4 and 72 hours. The higher the reaction temperature that can be chosen, i.e. the higher the thermal stability of the reaction mixture, the shorter the reaction time that can be chosen.

For initiation of the polymerization, the input of heat is essential for the polymerization initiators that undergo thermal breakdown. For the polymerization initiators that undergo thermal breakdown, the polymerization can be initiated by heating to 50° C. or more, according to the initiator type. Preference is given to an initiator temperature of not more than 100° C., very preferably of not more than 80° C.

Free radicals are stabilized, in a favorable procedure, using nitroxides, for example (2,2,5,5-tetramethyl-1-pyrrolidinyl)oxyl (PROXYL), (2,2,6,6-tetramethyl-1-piperidinyl) oxyl (TEMPO), derivatives of PROXYL or of TEMPO and further nitroxides familiar to the person skilled in the art.

A number of further polymerization methods by which the epoxy-functionalized (co)polymers can be prepared in an alternative procedure can be chosen from the prior art: WO 96/24620 A1 describes a polymerization process in which very specific free-radical compounds, for example phosphorus-containing nitroxides based on imidazolidine, are used. WO 98/44008 A1 discloses specific nitroxyls based on morpholines, piperazinones and piperazinediones. DE 199 49 352 A1 describes heterocyclic alkoxy amines as regulators in controlled free-radical polymerizations.

A further controlled polymerization method that can be used is atom transfer radical polymerization (ATRP), wherein the polymerization initiators used are preferably monofunctional or difunctional secondary or tertiary halides, and the halide(s) is/are abstracted using complexes of Cu, Ni, Fe, Pd, Pt, Ru, Os, Rh, Co, Ir, Ag or Au. The different options for ATRP are also described in the documents U.S. Pat. No. 5,945,491 A, 5,854,364 A and 5,789,487 A.

A further preparation process conducted is a variant of RAFT polymerization (reversible addition-fragmentation chain transfer polymerization). The polymerization process is described in detail, for example, in documents WO 98/01478 A1 and WO 99/31144 A1. Particularly advantageous for the preparation are trithiocarbonates of the general structure R'''—S—C(S)—S—R''' (*Macromolecules*, 2000, 33, 243-245).

In a very advantageous variant, for example, the trithiocarbonates (TTC1) and (TTC2) or the thio compounds (THI1) and (THI2) are used for polymerization, where ϕ is a phenyl ring which may be unfunctionalized or functionalized by alkyl or aryl substituents bonded directly or via ester or ether bridges, a cyano group or a saturated or unsaturated aliphatic radical. The phenyl ring ϕ may optionally bear one or more polymer blocks, for example polybutadiene, polyisoprene or polystyrene, to name just a few. Functionalizations may, for example, be halogens, hydroxyl groups, epoxy groups, although this list does not make any claim to completeness.

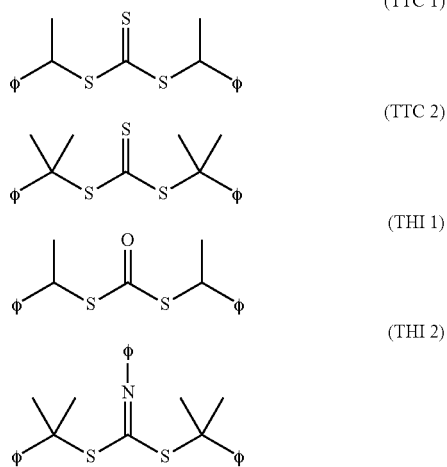

In conjunction with the abovementioned controlled free-radical polymerizations, preference is given to polymerization initiator systems that contain free-radical polymerization initiators for polymerization, especially the free-radical-forming azo or peroxo initiators that undergo thermal breakdown and have already been enumerated above. However, all polymerization initiators that are known for acrylates and/or methacrylates are suitable for this purpose. In addition, it is also possible to use free-radical sources that only release free radicals under UV irradiation. It is crucial that these initiators cannot activate any reaction of the epoxy functionalities.

The purpose of molar mass adjustment can also be accomplished using chain transfer reagents according to the prior art, provided that they do not have any reactivity toward epoxy groups or their reactivity with epoxy groups has been suppressed in some other way.

The desired molar mass is preferably established by polymerization methods, whether they be controlled polymerization methods or uncontrolled polymerization methods, in which no agents that can react with epoxy functionalities prior to the initiation of the curing reaction of the adhesive film or that can initiate or catalyze reaction of epoxy functionalities, or their reactivity with epoxy functionalities has been suppressed in some other way, are used.

The establishment of the desired molar mass can additionally and more preferably be achieved via the use ratio of polymerization initiator and (co)monomer(s) and/or the concentration of (co)monomers.

Reactive Adhesive Systems Based on Epoxy-Functionalized (Co)Polymers of the Invention The epoxy-functionalized (co)polymer of the invention is of excellent suitability in combination with a latently reactive initiator (curing agent) (A) that can be activated thermally and/or radiation-chemically (especially with UV radiation), and can then advantageously be used as curable reactive adhesive system or in a curable reactive adhesive system.

Correspondingly, the invention also relates to curable reactive adhesive systems that comprise or contain at least one type of epoxy-functionalized (co)polymer of the invention and at least one type of latently reactive initiator. By means of such curable reactive adhesive systems, it is then possible to produce adhesive bonds consisting of a first substrate to be bonded, a second substrate to be bonded, and a bonded product comprising at least one type of curable reactive adhesive system of the invention. The bond strength of the adhesive bond is obtained when the curable reactive adhesive system is in cured form in the composite.

In the context of this invention, entitlement as "cured system" or "cured adhesive composition" means that the adhesive composition with the epoxy-functionalized (co)polymer has been activated via action of the curing agent component and optionally a further stimulus such as heat and/or radiation, and a reaction involving the epoxy groups of the (co)polymer has taken place. However, there is no need for all epoxy groups that can be chemically involved in the curing reaction to have reacted. Instead, a conversion of 50% of the functional groups may already bring a sufficiently high glass transition temperature and be of very good suitability for the bonding application. A conversion of 50% is mentioned here by way of example. The statement made may also apply to higher conversions such as 60%, 70%, 80%, 90% or 100%, or even lower conversions such as 40% or 30%. What is crucial is that the bonding properties are in accordance with the application after performance of curing; in other words, for example, push-out resistance by test E is at least 2.0 N/mm².

Accordingly, reactive adhesive systems of the invention advantageously contain at least one type of curing agent. However, a curing agent is not absolutely necessary since the (co)polymer of the invention is self-crosslinking at sufficient temperature. However, if curing agents are used, they are selected such that the resulting formulation has very marked latency in its reactivity. This means that the adhesive system or the adhesive film based thereon, under particular conditions—for example at room temperature or even slightly elevated temperatures such as 35° C. or even 50° C. or with exclusion of light—shows essentially no reaction or even no reaction at all. The reaction ideally follows an activation impulse that can be triggered by elevated temperature and/or (UV) radiation. In the context of this invention, latency for thermally activatable systems is defined via the activation temperature that can be determined by means of a DSC experiment (test D). The activation temperature thus determined for thermal curing agents of the invention is at least 60° C., preferably at least 75° C., very preferably at least 90° C. It is at most 150° C., preferably at most 120° C. Thermal latency typically exists in the case of curing agents activatable by means of (UV) radiation. What has to be ensured here, by contrast, is exclusion of light until the desired juncture of activation.

Examples of suitable curing agents include thermally activatable acid formers, TAGs. The effect of heat results in release of a strong acid, called the superacid, from the initiator substance, and this acid can bring about ring opening of the epoxy groups. Thermally activatable initiators that are usable in the context of the present invention for cationic curing of epoxy groups are especially pyridinium salts, ammonium salts (especially anilinium salts) and sulfonium salts (especially thiolanium salts), and lanthanoid triflates.

N-Benzylpyridinium salts and benzylpyridinium salts are very advantageous, where aromatic systems may be substituted, for example, by alkyl, alkoxy, halogen or cyano groups. *J. Polym. Sci. A,* 1995, 33, 505ff, US 2014/0367670 A1, U.S. Pat. No. 5,242,715, *J. Polym. Sci. B,* 2001, 39, 2397ff, EP 393893 A1, *Macromolecules,* 1990, 23, 431ff, *Macromolecules,* 1991, 24, 2689, *Macromol. Chem. Phys.,* 2001, 202, 2554ff, WO 2013/156509 A2 and JP 2014/062057 A1 name corresponding compounds usable in this context of this invention.

Of the commercially available initiator systems, examples of compounds that are usable very advantageously include San-Aid SI 80 L, San-Aid SI 100 L, San-Aid SI 110 L, San-Aid SI B2A, San-Aid SI B3, San-Aid SI B3A and San-Aid SI B4 from Sanshin, Opton CP-66 and Opton CP-77 from Adeka, and K-Pure TAG 2678, K-Pure CXC 1612 and K-Pure CXC 1614, K-Pure CXC 1615, K-Pure CXC 1821 from King Industries.

Lanthanoid triflates are additionally usable, such as samarium(III) triflate, ytterbium(III) triflate, erbium(III) triflate or dysprosium(III) triflate (available from Sigma Aldrich), and lanthanum(III) triflate (available from Alfa Aesar).

Examples of anions which serve as counterions for the abovementioned cations include tetrafluoroborate, tetraphenylborate, hexafluorophosphate, perchlorate, tetrachloroferrate, hexafluoroarsenate, hexafluoroantimonate, pentafluorohydroxyantimonate, hexachloroantimonate, tetrakispentafluorophenylborate, tetrakis(pentafluoromethylphenyl)borate, bi(trifluoromethylsulfonyl)amide and tris(trifluoromethylsulfonyl)methide. Additionally usable are anions according to JP 2012-056915 A1 and EP 393893 A1. Initiators that are essentially free of chlorine and bromine are preferred. The anion is preferably arsenate- and antimonate-free.

The person skilled in the art is aware of further systems that are likewise usable in accordance with the invention. Latently reactive thermally activatable curing agents for cationic curing are used in uncombined form or as combinations of two or more thermally activatable curing agents.

The proportion of thermally activatable hardeners for the curing, especially cationic curing, based on the overall formulation, is preferably at least 0.1% by weight and at most 5% by weight, preferably at least 0.3% by weight and at most 3% by weight.

Activation temperatures that are advantageous in the context of the present invention, i.e. those temperatures at which the cationic curing of the epoxy-functionalized (co) polymers can be initiated, are at least 60° C., preferably at least 75° C., further preferably at least 90° C. Curing/initiation within these temperature ranges is preferred in order not to thermally damage thermally sensitive substrates. In the case of more thermally stable substrates, higher curing temperatures are also conceivable, for example at 120° C., 150° C., 180° C., 200° C. or even higher, and are even preferred for some bonding tasks. The curing time may be 15 min or more or 2 h or less, although distinctly shorter (such as 10 s, 30 s, 60 s, 120 s, 240 s, 5 min or 10 min) or even longer curing times are not ruled out.

Very preferred in combination with the epoxy-functionalized (co)polymer of the invention are additionally acid formers activatable by means of (UV) radiation, PAGs. These can bring about a cationic curing reaction of the epoxy groups via UV initiation.

Among the curing agents (initiators) for cationic UV curing, sulfonium-, iodonium- and metallocene-based systems in particular are usable.

For examples of sulfonium-based cations, reference is made to the details given in U.S. Pat. No. 6,908,722 B1 (especially columns 10 to 21).

Examples of anions which serve as counterions for the abovementioned cations include tetrafluoroborate, tetraphenylborate, hexafluorophosphate, perchlorate, tetrachloroferrate, hexafluoroarsenate, hexafluoroantimonate, pentafluorohydroxyantimonate, hexachloroantimonate, tetrakispentafluorophenylborate, tetrakis(pentafluoromethylphenyl)borate, bi(trifluoromethylsulfonyl)amide and tris(trifluoromethylsulfonyl)methide. Further anions usable, especially for iodonium-based curing agents (initiators), are also chloride, bromide or iodide. Additionally usable are anions according to JP 2012-056915 A1 and EP 393893 A1. Initiators that are essentially free of chlorine and bromine are preferred here too. Here too, the anion is preferably arsenic- and antimony-free.

More specifically, the usable systems include sulfonium salts (see for example U.S. Pat. Nos. 4,231,951 A, 4,256,828 A, 4,058,401 A, 4,138,255 A and US 2010/063221 A1) such as triphenylsulfonium hexafluoroarsenate, triphenylsulfonium hexafluoroborate, triphenylsulfonium tetrafluoroborate, triphenylsulfonium tetrakis(pentafluorobenzyl)borate, methyldiphenylsulfonium tetrafluoroborate, methyldiphenylsulfonium tetrakis(pentafluorobenzyl)borate, dimethylphenylsulfonium hexafluorophosphate, triphenylsulfonium hexafluorophosphate, triphenylsulfonium hexafluoroantimonate, diphenylnaphthylsulfonium hexafluoroarsenate, tritolylsulfonium hexafluorophosphate, anisyldiphenylsulfonium hexafluoroantimonate, 4-butoxyphenyldiphenylsulfonium tetrafluoroborate, 4-butoxyphenyldiphenylsulfonium tetrakis(pentafluorobenzyl)borate, 4-chlorophenyldiphenylsulfonium hexafluoroantimonate, tris(4-phenoxyphenyl)sulfonium hexafluorophosphate, di(4-ethoxyphenyl)methylsulfonium hexafluoroarsenate, 4-acetylphenyldiphenylsulfonium tetrafluoroborate, 4-acetylphenyldiphenylsulfonium tetrakis(pentafluorobenzyl)borate, tris(4-thiomethoxyphenyl)sulfonium hexafluorophosphate, di(methoxysulfonylphenyl)methylsulfonium hexafluoroantimonate, di(methoxynaphthyl)methylsulfonium tetrafluoroborate, di(methoxynaphthyl)methylsulfonium tetrakis(pentafluorobenzyl)borate, di(carbomethoxyphenyl)methylsulfonium hexafluorophosphate, (4-octyloxyphenyl)diphenylsulfonium tetrakis(3,5-bis-trifluoromethylphenyl)borate, tris[4-(4-acetylphenyl)thiophenyl]sulfonium tetrakis(pentafluorophenyl)borate, tris(dodecylphenyl)sulfonium tetrakis(3,5-bis(trifluoromethyl)phenyl)borate, 4-acetamidophenyldiphenylsulfonium tetrafluoroborate, 4-acetamidophenyldiphenylsulfonium tetrakis(pentafluorobenzyl)borate, dimethylnaphthylsulfonium hexafluorophosphate, trifluoromethyldiphenylsulfonium tetrafluoroborate, trifluoromethyldiphenylsulfonium tetrakis(pentafluorobenzyl)borate, phenylmethylbenzylsulfonium hexafluorophosphate, 5-methylthianthrenium hexafluorophosphate, 10-phenyl-9,9-dimethylthioxanthenium hexafluorophosphate, 10-phenyl-9-oxothioxanthenium tetrafluoroborate, 10-phenyl-9-oxothioxanthenium tetrakis(pentafluorobenzyl)borate, 5-methyl-10-oxothianthrenium tetrafluoroborate, 5-methyl-10-oxothianthrenium tetrakis(pentafluorobenzyl)borate and 5-methyl-10,10-dioxothianthrenium hexafluorophosphate, iodonium salts (see, for example, U.S. Pat. No. 3,729,313 A, 3,741,769 A, 4,250,053 A, 4,394,403 A and US 2010/063221 A1), such as diphenyliodonium tetrafluoroborate, di(4-methylphenyl)iodonium tetrafluoroborate, phenyl-4-methylphenyliodonium tetrafluoroborate, di(4-chlorophenyl)iodonium hexafluorophosphate, dinaphthyliodonium tetrafluoroborate, di(4-trifluoromethylphenyl)iodonium tetrafluoroborate, diphenyliodonium hexafluorophosphate, di(4-methylphenyl)iodonium hexafluorophosphate, diphenyliodonium hexafluoroarsenate, di(4-phenoxyphenyl)iodonium tetrafluoroborate, phenyl-2-thienyliodonium hexafluorophosphate, 3,5-dimethylpyrazolyl-4-phenyliodonium hexafluorophosphate, diphenyliodonium hexafluoroantimonate, 2,2'-diphenyliodonium tetrafluoroborate, di(2,4-dichlorophenyl)iodonium hexafluorophosphate, di(4-bromophenyl)iodonium hexafluorophosphate, di(4-methoxyphenyl)iodonium hexafluorophosphate, di(3-carboxyphenyl)iodonium hexafluorophosphate, di(3-methoxycarbonylphenyl)iodonium hexafluorophosphate, di(3-methoxysulfonylphenyl)iodonium hexafluorophosphate, di(4-acetamidophenyl)iodonium hexafluorophosphate, di(2-benzothienyl)iodonium hexafluorophosphate, diaryliodonium tristrifluoromethylsulfonylmethide such as diphenyliodonium hexafluoroantimonate, diaryliodonium tetrakis(pentafluorophenyl)borate such as diphenyliodonium tetrakis(pentafluorophenyl)borate, (4-n-desiloxyphenyl)phenyliodonium hexafluoroantimonate, [4-(2-hydroxy-n-tetradesiloxy)phenyl]phenyliodonium hexafluoroantimonate, [4-(2-hydroxy-n-tetradesiloxy)phenyl]phenyliodonium trifluorosulfonate, [4-(2-hydroxy-n-tetradesiloxy)phenyl] phenyliodonium hexafluorophosphate, [4-(2-hydroxy-n-tetradesiloxy)phenyl]phenyliodonium tetrakis(pentafluorophenyl)borate, bis(4-tert-butylphenyl) iodonium hexafluoroantimonate, bis(4-tert-butylphenyl)iodonium hexafluorophosphate, bis(4-tert-butylphenyl)iodonium trifluorosulfonate, bis(4-tert-butylphenyl)iodonium tetrafluoroborate, bis(dodecylphenyl)iodonium hexafluoroantimonate, bis(dodecylphenyl)iodonium tetrafluoroborate, bis(dodecylphenyl)iodonium hexafluorophosphate, bis(dodecylphenyl)iodonium trifluoromethylsulfonate, di(dodecylphenyl)iodonium hexafluoroantimonate, di(dodecylphenyl)iodonium triflate, diphenyliodonium bisulfate, 4,4'-dichlorodiphenyliodonium bisulfate, 4,4'-dibromodiphenyliodonium bisulfate, 3,3'-dinitrodiphenyliodonium bisulfate, 4,4'-dimethyldiphenyliodonium bisulfate, 4,4'-bissuccinimidodiphenyliodonium bisulfate, 3-nitrodiphenyliodonium bisulfate, dimethoxydiphenyliodonium bisulfate, bis(dodecylphenyl)iodonium tetrakis(pentafluorophenyl)borate, (4-octyloxyphenyl)phenyliodonium tetrakis(3,5-bis-trifluoromethylphenyl)borate and (tolylcumyl) iodonium tetrakis(pentafluorophenyl)borate, and ferrocenium salts (see for example EP 542 716 B1) such as $\eta_5$-(2,4-cyclopentadien-1-yl)[(1,2,3,4,5,6,9)(1-methylethyl)benzene]iron.

Examples of commercialized photoinitiators include Cyracure UVI-6990, Cyracure UVI-6992, Cyracure UVI-6974 and Cyracure UVI-6976 from Union Carbide, Optomer SP-55, Optomer SP-150, Optomer SP-151, Optomer SP-170 and Optomer SP-172 from Adeka, San-Aid SI-45L, San-Aid SI-60L, San-Aid SI-80L, San-Aid SI-100L, San-Aid SI-110L, San-Aid SI-150L and San-Aid SI-180L from Sanshin Chemical, SarCat CD-1010, SarCat CD-1011 and SarCat CD-1012 from Sartomer, Degacure K185 from Degussa, Rhodorsil Photoinitiator 2074 from Rhodia, CI-2481, CI-2624, CI-2639, CI-2064, CI-2734, CI-2855, CI-2823 and CI-2758 from Nippon Soda, Omnicat 320, Omnicat 430, Omnicat 432, Omnicat 440, Omnicat 445, Omnicat 550, Omnicat 550 BL and Omnicat 650 from IGM Resins, Daicat II from Daicel, UVAC 1591 from Daicel-Cytec, FFC 509 from 3M, BBI-102, BBI-103, BBI-105, BBI-106, BBI-109, BBI-110, BBI-201, BBI-301, BI-105, DPI-105, DPI-106, DPI-109, DPI-201, DTS-102, DTS-103, DTS-105, NDS-103, NDS-105, NDS-155, NDS-159, NDS-165, TPS-102, TPS-103, TPS-105, TPS-106, TPS-109, TPS-1000, MDS-103, MDS-105, MDS-109, MDS-205, MPI-103, MPI-105, MPI-106, MPI-109, DS-100, DS-101, MBZ-101, MBZ-201, MBZ-301, NAI-100, NAI-101, NAI-105, NAI-106, NAI-109, NAI-1002, NAI-1003, NAI-1004, NB-101, NB-201, NDI-101, NDI-105, NDI-106, NDI-109, PAI-01, PAI-101, PAI-106, PAI-1001, PI-105, PI-106, PI-109, PYR-100, SI-101, SI-105, SI-106 and SI-109 from Midori Kagaku, Kayacure PCI-204, Kayacure PCI-205, Kayacure PCI-615, Kayacure PCI-625, Kayarad 220 and Kayarad 620, PCI-061T, PCI-062T, PCI-020T, PCI-022T from Nippon Kayaku, TS-01 and TS-91 from Sanwa Chemical, Deuteron UV 1240 from Deuteron, Tego Photocompound 1465N from Evonik, UV 9380 C-D1 from GE Bayer Silicones, FX 512 from Cytec, Silicolease UV Cata 211 from Bluestar Silicones and Irgacure 250, Irgacure 261, Irgacure 270, Irgacure PAG 103, Irgacure PAG 121, Irgacure PAG 203, Irgacure PAG 290, Irgacure CGI 725, Irgacure CGI 1380, Irgacure CGI 1907 and Irgacure GSID 26-1 from BASF.

Further systems likewise usable as curing agent in accordance with the invention are known to those skilled in the art. Photoinitiators are used in uncombined form or as a combination of two or more photoinitiators.

Photoinitiators which exhibit absorption at less than 350 nm and advantageously at greater than 250 nm are advantageous. Initiators which absorb above 350 nm, for example in the range of violet light, are likewise employable. Particular preference is given to using sulfonium-based photoinitiators since they exhibit advantageous UV-absorption characteristics.

The proportion of photochemically activatable hardeners (initiators) for cationic curing, based on the overall composition, is preferably at least 0.1% by weight and at most 5% by weight, preferably at least 0.3% by weight and at most 3% by weight.

It is also advantageous to choose curing agents that can be activated by both methods of stimulation: by heat and by (UV) radiation. It is also possible to employ combinations of thermally and photochemically activatable curing agents (initiators).

Even though preference is given to TAG and PAG systems in combination with the epoxy-functionalized (co)polymers of the invention, other curing agent systems are also conceivable alternatively or in combination. Here too, preference is given to systems that have latency in the formulation.

Examples include latently reactive diamines or multifunctional amines, dicarboxylic acids or multifunctional carboxylic acids, difunctional acid anhydrides or multifunctional acid anhydrides, primary dithiols or multifunctional primary thiols. Particularly advantageous coreactants with regard to latency are those that are solid at room temperature and, in the non-softened state, are not soluble in the polymer of the invention or a mixture containing said polymer, but are soluble in the softened state or the two melts are miscible with one another.

Also conceivable are curing agents (initiators) that are in encapsulated form and are distributed in the film matrix under the influence of heat and can then lead to reaction.

The epoxy-functionalized (co)polymer in the uncured state has a first glass transition temperature below that temperature at which the adhesive bond consisting of adhesive film comprising the epoxy-functionalized (co)polymer and substrates to be bonded is created by lamination. In the context of this invention, the temperature utilized for the lamination is called "lamination temperature". The temperature differential between the lamination temperature and the glass transition temperature of the uncured (co)polymer in this case is preferably at least 20° C., especially at least 40° C., where the lamination temperature is above the glass transition temperature.

In addition, it is advantageous when the curable reactive adhesive system comprising the epoxy-functionalized (co)polymer in the uncured state has a first glass transition temperature below that temperature at which the adhesive bond consisting of reactive adhesive film and substrates to be bonded is created by lamination, such that the formulation under lamination conditions under pressure permits sufficient wetting on the substrate(s) within a defined period of time. The temperature difference between the lamination temperature and glass transition temperature is preferably at least 20° C., especially at least 40° C. or even at least 100° C., the lamination temperature being above the glass transition temperature. The lamination temperature is advantageously between 40° C. and 100° C., especially between 50° C. and 80° C. It is below the activation temperature, i.e. that temperature at which the curing of the curable adhesive composition is initiated if the adhesive system is thermally activatable. The difference between lamination temperature and activation temperature in that case is advantageously at least 20° C., especially at least 40° C.

Rather than the activation temperature, (UV) radiation is used in radiation-chemically curable adhesive systems. This can be effected at the lamination temperature—this being preferred—or at another temperature.

The epoxy-functionalized (co)polymer is preferably not pressure-sensitively adhesive under standard conditions (23° C., 50% rh). In the incompletely reacted state, it has a glass transition temperature of at least 0° C., preferably of at least 25° C. This can be utilized advantageously in order that an adhesive formulation comprising this (co)polymer is not pressure-sensitively adhesive. This characteristic permits advantageous positioning of the adhesive products in the bonding process and no premature sticking to a surface in the wrong position. Furthermore, this characteristic is found to be advantageous for thermally curable reactive adhesive systems since any reactivity in the vitreous/viscoelastic state is significantly (kinetically) lowered and improved latency is achieved thereby. But the polymer may also be slightly pressure-sensitively adhesive.

The adhesive composition may be pressure-sensitively adhesive under standard conditions (23° C., 50% rel. air humidity). In that case, it has a glass transition temperature in the uncured state below 0° C., preferably of at most −25° C. These characteristics simplify finishing processes such as the preliminary dimensioning of adhesive tape sections for the later bonding process or else lamination steps in the production of adhesive product constructions and component bonding. In the lamination process, it is not absolutely necessary in this case to work at elevated temperature; instead, lamination is possible at room temperature since sufficient contact between adhesive composition and the substrates to be bonded can already be achieved via the lamination pressure. UV radiation is an excellent option for curing in this case. However, thermal activation is also possible.

"Pressure-sensitive adhesive compositions" (PSAs) are understood, as usual, to mean those viscoelastic polymeric materials which—optionally via suitable addititization with further components, for example tackifying resins—have lasting tackiness and permanent adhesiveness at the use temperature (unless defined otherwise, at room temperature, i.e. 23° C.) and adhere on contact to a multitude of surfaces and especially stick immediately (have what is called "tack"). They are capable, even at the use temperature, without activation by solvent or by heat—optionally under the influence of a greater or lesser pressure—of sufficiently wetting a substrate to be bonded such that sufficient interactions for adhesion can form between the composition and the substrate.

The adhesive composition may alternatively have only low or zero pressure-sensitive adhesion under standard conditions (23° C., 50% rel. air humidity). In order to establish this, it then has a glass transition temperature in the uncured state of typically at least 0° C., preferably at least 25° C. This characteristic permits advantageous positioning of the adhesive products in the bonding process and no premature sticking to a surface in the wrong position. Furthermore, this characteristic is found to be advantageous for latently reactive adhesive systems since any reactivity in the vitreous/viscoelastic state is significantly (kinetically) lowered and improved latency is achieved thereby. For the lamination process, in that case, not only pressure but also an elevated temperature is required.

Epoxy-functionalized (co)polymers can be used as described in reactive adhesive compositions. As well as the curing agents (A), they are advantageously combined with further constituents that adjust the properties of the adhesive system as desired. Mention should be made in this connection of film formers (B), tackifying resins (C), low-viscosity reactive resins (D), fillers (E), and adhesion promoters (F) and further admixtures/additives (G).

Film Formers (B)

Suitable film formers for reactive adhesive compositions of the invention are thermoplastic materials, elastomers and thermoplastic elastomers. They are especially selected such that, in combination with the further formulation constituents, they make it possible to obtain those adhesive compositions that are advantageous with regard to processability at the adhesive tape manufacturer on the one hand and adhesive tape user on the other hand, with regard to adhesive properties and with regard to further improvement in the dimensional stability of the adhesive films in relation, for example, to the administration of the adhesive product or squeeze-out characteristics in a hot lamination process, to name just a few particularly important requirements. The proportion thereof is typically at most 75% by weight or at most 50% by weight. It is also possible to dispense with such polymers.

In an advantageous procedure, thermoplastic materials are used as matrix polymers (B). Examples are semicrystalline polyolefins and ethylene-vinyl acetate copolymers (EVA).

Preferred polyolefins are prepared from ethylene, propylene, butylene and/or hexylene, where it is possible in each case to polymerize the pure monomers mentioned or to copolymerize mixtures of the monomers mentioned. It is possible via the polymerization process and by the choice of monomers to control the physical and mechanical properties of the polymer, for example the softening temperature and/or specific mechanical properties.

Elastomers are very advantageously usable as matrix polymers (B). Examples include rubber or synthetic rubber as starting material for the adhesive compositions. There are various possible variations here, whether for rubbers from the group of the natural rubbers or the synthetic rubbers or whether from any blend of natural rubbers and/or synthetic rubbers, where the natural rubber(s) may in principle be chosen from any available qualities, for example crepe, RSS, ADS, TSR or CV types, according to the required level of purity and viscosity, and the synthetic rubber(s) may be chosen from the group of the randomly copolymerized styrene-butadiene rubbers (SBR), the butadiene rubbers (BR), the synthetic polyisoprenes (IR), the butyl rubbers (IIR), the halogenated butyl rubbers (XIIR), the acrylate rubbers (ACM), EPDM, the polybutylenes or the polyisobutylenes. Elastomers may also be (partly) hydrogenated. Nitrile rubbers are very advantageous, especially those that have been hot-polymerized, and those having acrylonitrile content between 15% and 50%, preferably between 30% and 45%, and a Mooney viscosity (ML 1+4, 100° C.) between 30 and 110, preferably between 60 and 90.

Also very advantageous are poly(meth)acrylates that are formed from (co)monomers (b), (c) and/or (d) and have a weight-average molar mass of at least 250 000 g/mol and typically at most 5 000 000 g/mol, especially of at least 500 000 g/mol and at most 2 000 000 g/mol. The glass transition temperature of these poly(meth)acrylates may especially be below 25° C. or even below 0° C. and especially below −25° C. In this way, pressure-sensitively adhesive reactive adhesive systems are obtainable.

Also advantageous are thermoplastic elastomers and here especially block copolymers, star copolymers and/or graft copolymers having a (weight-average) molar mass Mw of 300 000 g/mol or less, preferably 200 000 g/mol or less. Smaller molar masses are preferred owing to their improved processability. The molar mass should not be below 50 000 g/mol. Specific examples are styrene-butadiene block copolymers (SBS), styrene-isoprene block copolymers (SIS), styrene-(isoprene/butadiene) block copolymers (SIBS) and (partly) hydrogenated variants such as styrene-(ethylene/butylene) block copolymers (SEBS), styrene-(ethylene/propylene) block copolymers (SEPS, SEEPS), styrene-(butylene/butyl) block copolymers (SBBS), styrene-isobutylene block copolymers (SiBS) and polymethylmethacrylate-polyacrylate block copolymers. These block copolymers may be used in the form of a linear or multiarm structure, in the form of a diblock copolymer, triblock copolymer or multiblock copolymer, or in the form of mixtures of different types.

Further advantageous examples of thermoplastic elastomers are thermoplastic polyurethanes (TPUs). Polyurethanes are chemically and/or physically crosslinked polycondensates that are typically formed from polyols and isocyanates and contain soft segments and hard segments.

The soft segments consist, for example, of polyesters, polyethers, polycarbonates, each preferably aliphatic in nature in the context of this invention, and hard polyisocyanate segments. According to the nature and use ratio of the individual components, materials that can be used advantageously in the context of this invention are obtainable. Raw materials available to the formulator for this purpose are specified, for example, in EP 894 841 B1 and EP 1 308 492 B1. Also usable as thermoplastic elastomers for matrix polymers (B) are polyolefin-based thermoplastic elastomers, polyetherester elastomers, polyamides such as polyesteramides, polyetheresteramides, polycarbonateesteramides and polyether-block-amides.

If matrix polymers (B) are used, those chosen, prior to the initiation of the curing process, enter into essentially no reaction or especially no reaction at all with epoxy functionalities or initiate or catalyze no reactions of the epoxy functionalities, or reaction with epoxy functionalities has been suppressed in some other way.

Tackifying Resins (C)

The epoxy-functionalized (co)polymer of the invention is optionally combined with at least one type of tackifying resin, advantageously with those compatible with the epoxy-functionalized (co)polymer and/or the matrix polymer (B). The proportion in the overall adhesive composition is at most 40% by weight, preferably at most 25% by weight, and may even be 0% by weight. It is advantageous when this tackifying resin has a tackifying resin softening temperature (ASTM E28) of greater than 25° C., especially of greater than 80° C.

Tackifying resins (C) used in the adhesive composition may, for example, be partly or fully hydrogenated or disproportionated resins based on rosin and rosin derivatives, indene-coumarone resins, terpene-phenol resins, phenolic resins, hydrogenated polymers of dicyclopentadiene, partly, selectively or fully hydrogenated hydrocarbon resins based on C5, C5/C9 or C9 monomer streams, polyterpene resins based on α-pinene and/or β-pinene and/or δ-limonene, hydrogenated polymers of preferably pure C8 and C9 aromatics. The aforementioned tackifying resins can be used either alone or in a mixture.

In order to assure high aging and UV stability, preference is given to hydrogenated resins having a hydrogenation level of at least 90%, preferably of at least 95%.

Additionally preferred, especially in combination with nonpolar film formers, are nonpolar resins having a DACP (diacetone alcohol cloud point) value of above 30° C. and an MMAP (mixed methylcyclohexane-aniline point) value of greater than 50° C., especially having a DACP value above 37° C. and an MMAP value greater than 60° C. The DACP value and the MMAP value each indicate solubility in a particular solvent mixture. For definition and determination of the DACP and MMAP values, reference is made to C. Donker, PSTC Annual Technical Proceedings, p. 149-164, May 2001. With regard to MMAP, ASTM C611 may also be consulted.

If tackifying resins (C) are used, those chosen, prior to the initiation of the curing process, enter into essentially no reaction or especially no reaction at all with epoxy functionalities or initiate or catalyze no reactions of the epoxy functionalities, or reaction with epoxy functionalities has been suppressed in some other way.

Low-Viscosity Reactive Resins (D)

Optionally but advantageously, in combination with the epoxy-functionalized (co)polymers of the invention, it is possible to use reactive resins of low molecular weight. They are used in a proportion in the overall formulation of at most 50% by weight, preferably of at most 25% by weight, very preferably of at most 10% by weight. These low-viscosity reactive resins are especially cyclic ethers, i.e. compounds which bear at least one oxirane group, or oxetanes. They may be aromatic or especially aliphatic or cycloaliphatic in nature. Usable reactive resins may be monofunctional, difunctional, trifunctional or tetrafunctional or have higher functionality up to polyfunctionality, the functionality relating to the cyclic ether group.

Examples, without wishing to impose a restriction, are 3,4-epoxycyclohexylmethyl-3',4'-epoxycyclohexane carboxylate (EEC) and derivatives, dicyclopentadiene dioxide and derivatives, 3-ethyl-3-oxetanemethanol and derivatives, diglycidyl tetrahydrophthalate and derivatives, diglycidyl hexahydrophthalate and derivatives, ethane 1,2-diglycidyl ether and derivatives, propane 1,3-diglycidyl ether and derivatives, butane-1,4-diol diglycidyl ether and derivatives, higher alkane 1,n-diglycidyl ethers and derivatives, bis[(3,4-epoxycyclohexyl)methyl] adipate and derivatives, vinylcyclohexyl dioxide and derivatives, cyclohexane-1,4-dimethanolbis(3,4-epoxycyclohexane carboxylate) and derivatives, diglycidyl 4,5-epoxytetrahydrophthalate and derivatives, bis[1-ethyl(3-oxetanyl)methyl] ether and derivatives, pentaerythritol tetraglycidyl ether and derivatives, bisphenol A diglycidyl ether (DGEBA), hydrogenated bisphenol A diglycidyl ether, bisphenol F diglycidyl ether, hydrogenated bisphenol F diglycidyl ether, epoxyphenol novolaks, hydrogenated epoxyphenol novolaks, epoxycresol novolaks, hydrogenated epoxycresol novolaks, 2-(7-oxabicyclospiro(1,3-dioxane-5,3'-(7-oxabicyclo[4.1.0]-heptane)), 1,4-bis((2,3-epoxypropoxy)methyl)cyclohexane. Here too, preference is given to (cyclo)aliphatic epoxides. Compounds according to WO 2013/156509 A2 may likewise be used as reactive resins in the context of this invention.

Reactive resins may be used in their monomeric form or else dimeric form, trimeric form etc., up to their oligomeric form, especially if the weight-average molecular weight does not reach 5000 g/mol. Since these reactive resins are typically of low viscosity, they harbor the risk that an excessively high proportion thereof in an adhesive formulation will lead to too high a propensity to be squeezed out. Therefore, preference is given to a minimum proportion in the overall formulation (at most 25% by weight, preferably at most 10% by weight). Up to 50% by weight may be used only when the proportion of epoxy-functionalized (co)polymer is at least 50% by weight and the sum total of the proportion of (co)monomers (a) and optionally (b) in the epoxy-functionalized (co)polymer is at least 50% by weight.

Mixtures of reactive resins with one another, or else with other co-reactive compounds such as alcohols (monofunctional or polyfunctional) or vinyl ethers (monofunctional or polyfunctional) are likewise possible. It is also possible to entirely dispense with reactive resins of low molecular weight.

Fillers (E)

If filler particles are employed in combination with epoxy-functionalized (co)polymers, they may preferably have a spherical, rod-like or platelet-like structure. Separated particles, often also called primary particles, are embraced by the invention in just the same way as aggregates formed from multiple primary particles. Systems of this kind often exhibit a fractal superstructure. If the particles are formed from crystallites, the primary particle form depends on the type of crystal lattice. Systems in platelet form may also be in the form of layer stacks. If fillers are employed, they are typically employed to an extent of up to 15% by weight.

In an advantageous embodiment of this invention, one type of filler in the adhesive formulation is essentially in the form of singular spherical particles. The particle diameters then have values of less than 500 nm, preferably of less than 100 nm, very preferably of less than 25 nm. In a further advantageous version of this invention, the at least one functionalized type of filler is present in the adhesive composition essentially in the form of singular particles in platelet form.

In that case, the layer thickness of such platelets has values of preferably less than 10 nm and a greatest diameter of preferably less than 1000 nm. In a further advantageous version of this invention, the at least one type of filler is present in the adhesive composition essentially in the form of singular particles in rod form. In this case, the rods have a diameter of less than 100 nm and a length of less than 15 µm. The rods may also be in curved form and/or flexible. In addition, it is advantageously possible in the context of this invention that the at least one type of filler in the adhesive composition is in the form of primary particle aggregates. These aggregates have a gyration radius (to be understood analogously to the term "gyration radius" known from polymers) of less than 1000 nm, preferably of less than 250 nm. Particular preference is given to using, in the context of this invention, those filler particles having a spatial extent in at least one direction of less than 250 nm, preferably less than 100 nm, very preferably less than 50 nm. It is also possible in the context of this invention to use combinations of the aforementioned types of filler.

Typical and further compound classes that are advantageous in accordance with the invention for fillers are inorganic oxides—especially metal oxides and/or semimetal oxides, salts of the alkaline earth metals and silicate-based minerals, especially clay minerals and clays. The amorphous or crystalline metal oxides usable in accordance with the invention include, for example, silicon dioxide, aluminum oxide, titanium dioxide, zirconium dioxide and zinc oxide. The person skilled in the art is familiar with further systems that can likewise be used in accordance with the invention. Alkaline earth metal salts include, for example, carbonates, sulfates, hydroxides, phosphates and hydrogenphosphates of magnesium, of calcium, of strontium and of barium. The clay minerals and clays usable in accordance with the invention especially include silicatic systems such as serpentines, kaolins, talc, pyrophyllite, smectites such as, in particular, montmorillonite, vermiculites, illites, mica, brittle mica, chlorites, sepiolite and palygorskite. In addition, it is possible in accordance with the invention to use synthetic clay minerals such as hectorites and the related systems thereof, for example Laponite® from Laporte and fluorohectorites and the related systems thereof, for example Somasif® from Co-Op.

Filler particles may be functionalized on their surface, and be hydrophobized or hydrophilized. A particularly advantageous functionalization is by means of epoxy-containing compounds that can take part in the curing reaction.

The fillers are not obligatory; the adhesive composition works even without addition of these individually or in any combination. Among the optional fillers as well, those chosen, prior to the initiation of the curing process, enter into essentially no reaction or especially no reaction at all with epoxy functionalities or initiate or catalyze no reactions of the epoxy functionalities, or reaction with epoxy functionalities has been suppressed in some other way.

Adhesion Promoter (F)

In combination with silane-based comonomers (d), if these are used, or else alternatively, adhesion promoters used in combination with epoxy-functionalized (co)polymers may be further silanes that are not incorporated into the epoxy-functionalized (co)polymers of the invention by polymerization.

Examples of silanes usable in the context of this invention, without wishing to impose a restriction, are methyltrimethoxysilane, methyltriethoxysilane, dimethyldimethoxysilane, dimethyldiethoxysilane, trimethylethoxysilane, ethyltrimethoxysilane, propyltrimethoxysilane, propyltriethoxysilane, isobutyltrimethoxysilane, isobutyltriethoxysilane, octyltrimethoxysilane, octyltriethoxysilane, isooctyltrimethoxysilane, isooctyltriethoxysilane, hexadecyltrimethoxysilane, hexadecyltriethoxysilane, octadecylmethyldimethoxysilane, phenyltrimethoxysilane, phenyltriethoxysilane, cyclohexylmethyldimethoxysilane, dicyclopentyldimethoxysilane.

One example of silyl-functionalized oligomers or polymers that may be used in accordance with the invention is polyethylene glycol joined to a trimethoxysilane group.

Further examples of usable silanes that bear at least one functionalization are vinyltrimethoxysilane, vinyltriethoxysilane, vinyltri(2-methoxyethoxy)silane, vinyltriisopropoxysilane, vinyldimethoxymethylsilane, vinyltriacetoxysilane, 3-glycidyloxypropyltrimethoxysilane, 3-glycidyloxypropyltriethoxysilane, 2-(3,4-epoxycyclohexyl)ethyltriethoxysilane, 3-glycidyloxypropyldiethoxymethylsilane, 3-methacryloyloxypropyltrimethoxysilane, 3-methacryloyloxypropyltriethoxysilane, 3-methacryloyloxypropyltriisopropoxysilane, 3-methacryloyloxypropyldimethoxymethylsilane, 3-methacryloyloxypropyldiethoxymethylsilane, 3-chloropropyltrimethoxysilane, 3-chloropropyltriethoxysilane, 3-ureidopropyltrimethoxysilane, 3-ureidopropyltriethoxysilane, 2-hydroxy-4-(3-triethoxysilylpropoxy)benzophenone, 4-(3'-chlorodimethylsilylpropoxy)benzophenone.

Further Additives (G)

Further optional constituents that may be added as admixtures/additives (G) to the epoxy-functionalized (co)polymer or to the adhesive composition based thereon are customary admixtures such as aging stabilizers (antiozonants, antioxidants, light stabilizers etc.). Possible additives to the adhesive system include the following:

- primary antioxidants, for example sterically hindered phenols
- secondary antioxidants, for example phosphites or thioethers
- processing stabilizers, for example C-radical scavengers
- light stabilizers, for example UV absorbers or sterically hindered amines
- processing auxiliaries, such as rheologically active additives (for example thickeners)
- wetting additives
- blowing agents such as chemical foaming agents and/or expanded or expandable microballoons and/or hollow beads such as hollow glass beads
- adhesion promoters
- compatibilizers
- colorants/pigments The admixtures or additives are not obligatory; one advantage of the adhesive composition of the invention is that it has its advantageous properties even without addition of additional additives individually or in any combination. Nevertheless, it may be advantageous and desirable in the specific case to adjust particular further properties of the adhesive composition by addition of additives.

Among the optional admixtures/additives as well, those chosen, prior to the initiation of the curing reaction, enter into essentially no reaction or especially no reaction at all with epoxy functionalities or neither initiate nor catalyze the reactions of the epoxy functionalities, or those in which reaction with epoxy functionalities has been suppressed in some other way.

APPLICATION EXAMPLES

Examples of applications in which the epoxy-functionalized (co)polymers of the invention can be utilized very advantageously include the executions which follow. Reactive adhesive systems based on formulations comprising epoxy-functionalized (co)polymers of the invention are particularly suitable for use in the form of adhesive films containing at least one layer of this adhesive system.

The layer thickness of the at least one layer of a curable reactive adhesive composition of the invention in such reactive adhesive tapes is typically between at least 10 µm and at most 500 µm, preferably between at least 20 µm and at most 250 µm. Useful layer thicknesses are 30 µm, 50 µm, 75 µm, 100 µm, 125 µm, 150 µm and 200 µm (each within the customary error tolerances).

The reactive adhesive tapes are especially double-sidedly adhesive products, although single-sidedly adhesive products are likewise possible. Such adhesive products comprising at least one layer of a curable adhesive composition including an epoxy-functionalized (co)polymer, in the simplest case, are used in monolayer form (such that the curable adhesive composition layer and the reactive adhesive tape are identical), applied to a further detachable (temporary) carrier material. Useful temporary carrier materials include all release films and papers that are known from the prior art and have been modified with a release layer on one or both sides. Papers may also have been single- or double-sidedly coated with polyethylene or polypropylene. It is also possible to use two plies of a redetachable carrier material, such that the top side and bottom side of the adhesive film are covered, even when the product is not in wound form. A temporary carrier material is not part of the bonded composite. It is removed from the reactive adhesive tape prior to bonding of the substrates.

Reactive adhesive tapes comprising at least one layer of a curable adhesive composition of the invention may additionally contain a further carrier material which is part of the composite even after bonding (permanent carrier). Films and papers are possible options for this purpose, but also laid scrims and woven and knitted fabrics. The surfaces of these carrier materials may each independently have been pretreated chemically (primer, plasma) and/or physically (corona, flame, plasma) such that particularly good anchoring of the curable adhesive film layer on the carrier material can be achieved. For the purpose of improving anchoring on permanent carrier materials, the adhesive composition may also be physically pretreated (corona, flame, plasma). Nonwoven fabrics are preferred. The basis weight of the nonwoven fabrics is preferably between 4 and 100 g/m$^2$, more preferably between 10 and 70 g/m$^2$. The thickness of these nonwoven fabrics is preferably between 20 and 100 µm, exceptionally preferably between 30 and 60 µm.

Reactive adhesive tapes having permanent carriers may bear, on the top side and/or bottom side, curable adhesive composition layers of different thickness and/or preferably curable adhesive composition layers of different types. If different curable adhesive composition layers are used, both especially contain at least one (co)polymer of the invention.

Reactive adhesive tapes comprising at least one layer of a curable adhesive composition including a (co)polymer of the invention may also be used in two-layer or multilayer and permanent carrier-free form. Preferably the uppermost layer and very preferably the lowermost layer as well are a layer of curable adhesive composition including (co)polymer of the invention, where these may be different in terms of thickness and/or type. If different curable adhesive film layers are used, both especially satisfy the remarks made with regard to curable adhesive compositions of the invention. In the case of multilayer reactive adhesive tapes with or without a permanent carrier, other executions that are possible in principle are those that have the curable adhesive composition of the invention on the top side and a layer of another adhesive on the bottom side, for example of a pressure-sensitive adhesive or of a hotmelt adhesive. Multilayer and permanent carrier-containing reactive adhesive tapes may have thicknesses of 30 µm to 1000 µm, preferably of 75 µm to 300 µm.

The reactive adhesive tape may be finished in web form as roll material, as sheet material or in diecut form, and be utilized as such for construction of the composite. The reactive adhesive tapes are preferably not pressure-sensitively adhesive at room temperature since the material can thus be finished very advantageously even without temporary carrier (for example diecut) and provided for the further processing operation. However, a pressure-sensitively adhesive configuration is also conceivable and advantageous.

Also part of the invention are composites comprising a first bonding substrate, a second bonding substrate and, arranged between them, a reactive adhesive tape of the invention comprising at least one layer of an epoxy-functionalized (co)polymer of the invention. In the final composite, the reactive adhesive tape is in the cured state. A typical means of preparation for such composites utilizing reactive adhesive tapes of the invention shall be mentioned by way of example.

In the simplest case, a diecut piece of reactive adhesive tape without temporary carrier is positioned manually, for example with the aid of tweezers, on the first component or between the components to be assembled. In a further execution, the diecut piece of reactive adhesive tape, after being positioned on the first component, is treated with a heat source, which increases adhesion of the diecut piece to the first component. This is done at the lamination temperature. In the simplest case, the heat source used may be an IR source, a flat iron or a hot plate. For this process, it is advantageous when the diecut piece is still equipped with a temporary carrier material in order to prevent adhesion of the adhesive film to the tool or heat source.

In a further advantageous configuration, the first component is positioned onto the diecut piece of reactive adhesive tape. The positioning is effected on the open side. On the reverse side there is still the temporary carrier material. Subsequently, a heat source introduces heat through the first component into the reactive adhesive tape. This is effected at the lamination temperature. This makes the adhesive film tacky, and it adheres more strongly to the first component than to the temporary carrier. It is heated by the first component.

For the introduction of heat, in a preferred version, a heating press is used. The ram of the heating press is manufactured, for example, from aluminum, brass or bronze, and its shape is generally adapted to the contours of the component or the dimensions of the diecut piece. In order to assure exact positioning of the diecut piece on the first component, in general, moldings fitted to the contours of the components to be bonded are used, which prevents slippage. Guide pins in the molding and corresponding guide holes in the temporary carrier material of the reactive adhesive tape can assure exact positioning between diecut piece and first component. Other means of positioning are conceivable. After heat activation, the first component with the adhesive film laminated on is removed from the molding. The entire operation can also be converted to an automatic operation.

The process for producing a composite of the invention therefore also relates to the component operation comprising the following steps:

a) fixing the first component (substrate) on a shaped component (a holder);

b) positioning the second component (substrate) to be bonded with a reactive adhesive tape including at least one layer of curable adhesive composition of the invention on the second component (substrate);

c) applying pressure and temperature, especially by means of a hot press ram;

d) removing the bonded composite from the shaped component (the holder), wherein recooling can optionally also be conducted between step c) and step d). In step c), pressure and temperature are applied. This temperature is the activation temperature. This is effected by means of a heating ram consisting of a material having good thermal conductivity. Advantageous materials are, for example, copper, brass, bronze or aluminum. But it is also possible to use other metals or alloys. In addition, the hot press ram should preferably assume the shape of the top side of one component. This shape may in turn be 2-dimensional or 3-dimensional in nature. The pressure is advantageously applied via a pneumatic cylinder. However, the application need not necessarily be effected via air pressure. Also possible are, for example, hydraulic press apparatuses or electromechanical drives, for example via spindles. In addition, it may be advantageous to introduce pressure and temperature repeatedly, in order, for example, to increase process throughput by series connection or the rotation principle. The hot press rams in this case need not all be operated at the same temperature and/or the same pressure. In addition, it is also possible to choose different contact times of the rams. Rather than the activation temperature or in combination with an activation temperature or another temperature, it is also possible to utilize (UV) radiation for activation.

For the adhesive products based on the adhesive systems described, various uses are conceivable, of which it is possible here to name just a selection for example purposes, and which should not be regarded as a restriction: thermally curable reactive adhesive tapes (for example for high-strength component bonds), UV-curable reactive adhesive tapes (for example for high-strength component bonds), thermally curable sealing adhesive tapes, UV-curable sealing adhesive tapes. Since the adhesive systems are based on poly(meth)acrylates, adhesive systems can be produced in high optical quality and correspondingly be used for bonding tasks in which such demands have to be fulfilled.

EXPERIMENTAL

Figure 1B:
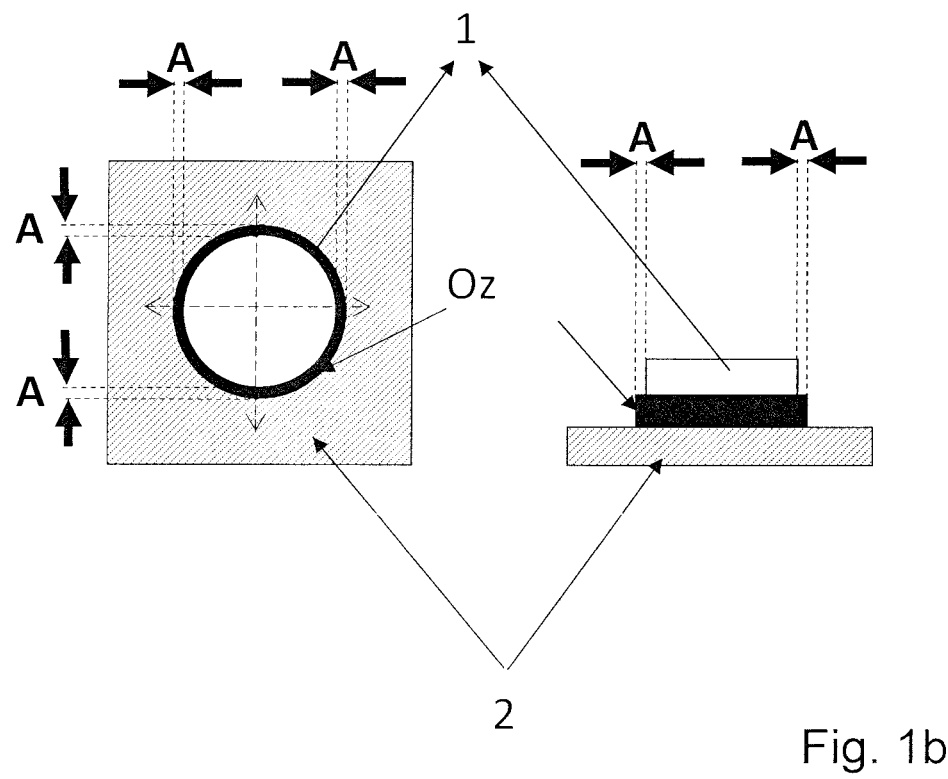

Test Methods
Test A—Squeezing-Out (Oozing)
The oozing test enables conclusions as to the squeeze-out characteristics of the adhesive composition (see also FIG. 1). For the procedure see also FIGS. 1a and 1b. For this purpose, a circular substrate (1) of polycarbonate with diameter 21 mm is bonded by the adhesive film (3) to be examined to a second substrate (2) of anodized aluminum. The second substrate has a circular hole with diameter 9 mm; the first substrate was applied in a centered manner with the adhesive product above this hole. The adhesive product (3) (in the form of a transfer adhesive tape specimen) likewise has a diameter of 21 mm and a thickness of 100 μm, and was correspondingly cut to size or diecut.

A composite composed of the substrate (1) (polycarbonate; Macrolon 099) and substrate (2) (anodized aluminum; E6EV1) was examined. Substrate (1) has a thickness of 1.0 mm and substrate (2) has a thickness of 3.0 mm.

The adhesive product/the adhesive film is prelaminated to substrate (1) at 70° C., and the composite (substrate (1) and adhesive product (3)) is then prelaminated onto substrate (2). The total time of thermal contact (70° C.) in the prelamination process must not exceed 30 s. Subsequently, the entire composite is pressed under pressure and temperature. Temperature, pressure and pressing time are noted with the results. The pressing conditions chosen were 180° C., 12 sec, 10 bar.

After the pressing, the squeeze-out characteristics of the adhesive film were determined. At four positions at right angles to one another, "north", "east", "south" and "west", in radial direction in each case, based on the circular polycarbonate substrate, the maximum distance A from the edge of the polycarbonate substrate to the outermost edge of the squeezed-out composition (Oz) on the corresponding side is measured with a precision-scale magnifying glass having a 1/10 mm scale division. The result was the average from the four individual measurements.

For many applications, a minimum propensity to be squeezed out is required. Oozing by the present test methodology is at most 1.5 mm, preferably 0 mm.

Test B—Molecular Weight, GPC

Molar masses are determined using a clear-filtered 100 μL sample (sample concentration 1.5 g/L). The eluent used is tetrahydrofuran with 0.1% by volume of trifluoroacetic acid, and the internal standard 200 ppm (m/v) of toluene. The measurement is made at 25° C.

The pre-column used is a column of the PSS-SDV type, 10 μm, ID 8.0 mm×50 mm (values here and hereinafter in the sequence: type, particle size, internal diameter×length). Separation is accomplished using a column of the PSS-SDV type, 10 μm linear one, ID 8.0 mm×300 mm (column and detector from Polymer Standards Service; detection by means of PSS-SECcurity 1260 RID detector). The flow rate is 0.5 mL per minute. Calibration is conducted with polystyrene standards in the separation region of the column, and converted universally to a polymethylmethacrylate calibration with utilization of the known Mark-Houwink coefficients a and K.

Test C—Glass Transition Temperature (DSC)

Figure 2:
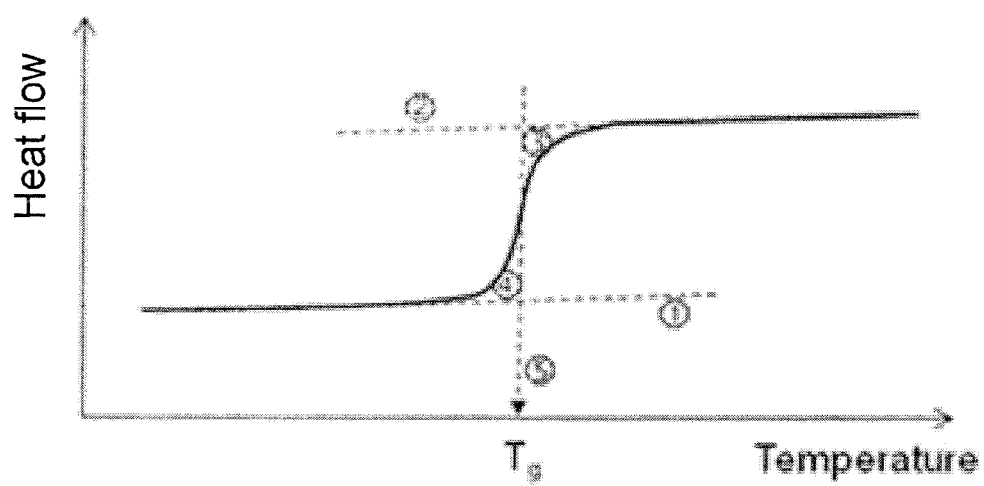
FIG. 2 depicts a curve of glass transition temperature.

Glass transition temperature ($T_G$) is determined by means of dynamic differential calorimetry (DSC: differential scanning calorimetry) using a Netzsch DSC 204 F1. The sample is weighed into reinforced aluminum crucibles (lid manually perforated). The temperature program runs two heating ramps, firstly cooling from 25° C. to −100° C. with liquid nitrogen and heating up to 180° C. at 10 K/min. Glass transitions are recognized as steps in the thermogram. The glass transition temperature is evaluated as follows (in this regard, see FIG. 2). A tangent is applied in each case to the baseline of the thermogram before 1 and after 2 of the step. In the region of the step, a line 3 of best fit is placed parallel to the ordinate in such a way that the two tangents intercept, specifically such as to form two areas 4 and 5 (between the respective tangent, the line of best fit, and the measurement plot) of equal content. The point of intersection of the lines of best fit positioned accordingly and the measurement plot gives the glass transition temperature.

Subsequently, the sample is cooled back down to −100° C. and heated up to 250° C. at 10 K/min. The first and second heating ramps are evaluated. The glass transition temperature thus ascertained in the first heating curve corresponds to the glass transition temperature of the uncrosslinked polymer. The glass transition temperature ascertained, resulting from the second heating curve, corresponds to a glass transition temperature of the polymer crosslinked by the thermal stress of the measurement, or of a polymer or formulation crosslinked by the activation of a thermal crosslinker/initiator, in the case that one is present in a polymer or formulation. For nonreactive systems too, glass transition temperature can be determined in this way. The step in the second heating curve is then evaluated as the result.

Test D—Activation Temperature (DSC)

The activation temperature required for the thermal curing of the cationically curable reactive resins is determined via differential scanning calorimetry (DSC). The specimens are analyzed in Al crucibles with a perforated lid and nitrogen atmosphere. In order to achieve good coverage of the crucible base with the sample, the specimen in the instrument is first heated up to 40° C. and cooled back down to 25° C. The actual measurement is started at 25° C.; the heating curve runs at a heating rate of 10 K/min. The first heating curve is evaluated. The onset of the thermally initiated curing reaction is registered by the measurement apparatus by the associated enthalpy of reaction released and indicated as an exothermic signal (peak) in the thermogram. The activation temperature used is that temperature in this signal at which the measurement curve begins to depart from the baseline (the first derivative of the thermogram can serve as an aid for finding this point; the commencement of the reaction can be connected to the point in the thermogram at which the difference between the first derivative of the peak in the onset region and the first derivative of the baseline of the thermogram assumes a magnitude of 0.01 mW/(K min); if the diagram shows upward exothermic signals, the sign is positive; if they are shown in the downward direction, the sign is negative). In addition, the integral normalized to the amount of specimen weighed out is noted.

Test E—Push-Out Resistance

The push-out test enables conclusions as to the bond strength of an adhesive product in the direction of the adhesive layer normal. For this purpose, a circular substrate (1) with diameter 21 mm is bonded by the adhesive film to be examined to a second substrate (1 or 2). The second substrate has a circular hole with diameter 9 mm; the first substrate was applied in a centered manner with the adhesive product above this hole. The adhesive product likewise has a diameter of 21 mm, and was correspondingly cut to size or diecut.

A composite composed of the substrate (1) (polycarbonate; Macrolon 099) and substrate (2) (anodized aluminum; E6EV1) was examined. Substrate (1) has a thickness of 1.0 mm and substrate (2) has a thickness of 3.0 mm.

The adhesive product/the adhesive film is prelaminated to substrate (1) at 70° C., and the composite (substrate (1) and adhesive product) is then prelaminated onto substrate (2). The total time of thermal contact (70° C.) in the prelamination process must not exceed 30 s. Subsequently, the entire composite is pressed under pressure and temperature. Temperature, pressure and pressing time are noted with the results. The pressing conditions chosen were 180° C., 12 sec, 10 bar.

By means of a cylindrical ram (diameter 7 mm) clamped in a tensile tester, pressure is exerted through the hole in substrate (2) on the composite (substrate (1) and adhesive product) and hence a force is exerted on the adhesive bond in the composite. Substrate (2) is fixed in the tensile tester such that very substantially all-round, flat laying/fixing is assured; substrate (1) can be freely pushed out by the ram. The testing speed is 10 mm/s. The force at which the bond fails and substrate (1) is parted from substrate (2) is recorded. The force is based on the bond area (282 mm$^2$), and so the result is push-out resistances in units of N/mm$^2$. The test conditions are 23° C. and 50% relative humidity; the specimens are stored after pressing under the test conditions for 48 h. The results are averages from three individual tests and are reported in N/mm$^2$. In many applications, high bond strengths are required. An indication of good bond strength by the present test is at least 2 N/mm$^2$, and for very good bond strength at least 4.0 N/mm$^2$.

EXAMPLES

Raw Materials Used:
Vazo® 52 2,2-azobis(2,4-dimethylvaleronitrile) from DuPont
TTA15 3,4-epoxycyclohexylmethyl methacrylate from Tetrachem
K-Pure® CXC 1614 thermal activator based on a quaternary ammonium salt of trifluoromethanesulfonic acid from King Industries
Desmomelt® 530 polyurethane from Covestro
Uvacure 1500 (3',4'-epoxycyclohexane)methyl (3,4-epoxycyclohexyl)carboxylate from Allnex
Production of the adhesive compositions and reactive adhesive tape specimens:

Example A

A pressure-resistant 2 L polymerization reactor of a conventional type for free-radical polymerizations was charged with 100 g of 3,4-epoxycyclohexylmethyl methacrylate and 396 g of methyl ethyl ketone. After passing nitrogen gas through while stirring for 45 minutes, the reactor was heated up to product temperature 70° C. and evacuated to boiling. Subsequently, 2.0 g of 2,2-azobis(2,4-dimethylvaleronitrile) dissolved in 4.0 g of methyl ethyl ketone were added. The reaction is conducted at a constant product temperature of 70° C. under evaporative cooling. After a reaction time of 1 h, 100 g of 3,4-epoxycyclohexylmethyl methacrylate that had been preheated to 70° C. and through which nitrogen had been passed for 45 minutes were added, and 2.0 g of 2,2-azobis(2,4-dimethylvaleronitrile) dissolved in 4.0 g of methyl ethyl ketone were added. After a reaction time of 2 h, 100 g of 3,4-epoxycyclohexylmethyl methacrylate that had been preheated to 70° C. and through which nitrogen had been passed for 45 minutes were added, and 2.0 g of 2,2-azobis(2,4-dimethylvaleronitrile) dissolved in 4.0 g of methyl ethyl ketone were added. After a reaction time of 3 h, 100 g of 3,4-epoxycyclohexylmethyl methacrylate that had been preheated to 70° C. and through which nitrogen had been passed for 45 minutes were added, and 2.0 g of 2,2-azobis(2,4-dimethylvaleronitrile) dissolved in 4.0 g of methyl ethyl ketone were added. The reaction was terminated after 24 h reaction time and cooled to room temperature.

The molar mass of the resulting polymer was 15 900 g/mol.

The glass transition temperature of the uncured polymer was 32° C., determined from the first heating curve by test C. The material produced by self-curing during the heating phase in the DSC experiment had a glass transition temperature of 72° C. in the second heating curve.

Example B

A pressure-resistant 2 L polymerization reactor of a conventional type for free-radical polymerizations was charged with 400 g of 3,4-epoxycyclohexylmethyl methacrylate, 420 g of isopropanol and 726 g of methyl ethyl ketone. After passing nitrogen gas through while stirring for 45 minutes, the reactor was heated up to product temperature 65° C. and evacuated to boiling. Subsequently, 4.0 g of 2,2-azobis(2,4-dimethylvaleronitrile) dissolved in 8.0 g of methyl ethyl ketone were added. The reaction is conducted at a constant product temperature of 65° C. under evaporative cooling. After a reaction time of 7 h, 4.0 g of 2,2-azobis(2,4-dimethylvaleronitrile) dissolved in 8.0 g of methyl ethyl ketone were added. The reaction was terminated after 24 h reaction time and cooled to room temperature.

The molar mass of the resulting polymer was 25 900 g/mol.

The glass transition temperature of the uncured polymer was 34° C., determined from the first heating curve by test C. The material produced by self-curing during the heating phase in the DSC experiment had a glass transition temperature of 68° C. in the second heating curve.

Example C

A pressure-resistant 2 L polymerization reactor of a conventional type for free-radical polymerizations was charged with 400 g of 3,4-epoxycyclohexylmethyl methacrylate, 420 g of isopropanol and 150 g of methyl ethyl ketone. After passing nitrogen gas through while stirring for 45 minutes, the reactor was heated up to product temperature 65° C. and evacuated to boiling. Subsequently, 1.6 g of 2,2-azobis(2,4-dimethylvaleronitrile) dissolved in 30.4 g of isopropanol were added. The reaction is conducted at a constant product temperature of 65° C. under evaporative cooling. After a reaction time of 7 h, 1.6 g of 2,2-azobis(2,4-dimethylvaleronitrile) dissolved in 30.4 g of isopropanol were added. After a reaction time of 14 hours, the mixture was diluted with 100 g of methyl ethyl ketone. The reaction was terminated after 24 h reaction time and cooled to room temperature.

The molar mass of the resulting polymer was 30 600 g/mol.

The glass transition temperature of the uncured polymer was 38° C., determined from the first heating curve by test C. The material produced by self-curing during the heating phase in the DSC experiment had a glass transition temperature of 70° C. in the second heating curve.

Examples I

For the production of reactive adhesive tape specimens (examples I1 and I2, comparative example C1), all the formulation constituents required were dissolved in solvent and any insoluble constituents such as inorganic fillers were suspended with a dispersion disk and coated as a solution or suspension. The solvent content in the solutions was 80% by weight. The solvent used was methyl ethyl ketone. The coating was effected on a siliconized release paper. Coated and dried specimens were dried at 50° C. for 30 min. After drying, the adhesive layer thickness of the coats was 100 μm (within the customary error tolerances). After 24 h, the reactive adhesive tape specimens were processed to give test specimens and these were then analyzed after a further 48 h. Details of the test specimens can be found in the respective test methods.

Example I1—Reactive Adhesive Tape Thermally Curable 9.7% by weight of polymer from example A were admixed with 90% by weight of Desmomelt 530 as film former (B) and 0.3% by weight of K-Pure CXC 1614 as curing agent (A). For the resulting reactive adhesive tapes, bond strength (push-out resistance by test E) and squeeze-out propensity in the pressing step (test A) were examined. The push-out resistance was 5.5 N/mm$^2$ and the squeeze-out propensity 0 mm.

Example I2—Reactive Adhesive Tape Thermally Curable 49.7% by weight of polymer from example A were admixed with 50% by weight of Desmomelt 530 as film former (B) and 0.3% by weight of K-Pure CXC 1614 as curing agent (A). For the resulting reactive adhesive tapes, bond strength (push-out resistance by test E) and squeeze-out propensity in the pressing step (test A) were examined. The push-out resistance was 2.2 N/mm$^2$ and the squeeze-out propensity 1.4 mm.

Comparative Example C1—Reactive Adhesive Tape Thermally Curable 9.7% by weight of Uvacure 1500 (low molecular weight cycloaliphatic diepoxide) were admixed with 90% by weight of Desmomelt 530 as film former (B) and 0.3% by weight of K-Pure CXC 1614 as curing agent (A). The formulation did not contain any (co)polymer of the invention. For the resulting reactive adhesive tapes, bond strength (push-out resistance by test E) and squeeze-out propensity in the pressing step (test A) were examined. The push-out resistance was 2.5 N/mm$^2$ and the squeeze-out propensity >1.5 mm.

It is clear from the examples and comparative example that epoxy-functionalized (co)polymers of the invention can be utilized advantageously in curable adhesive compositions. These (co)polymers achieve bond strengths in accordance with the stated object. Squeeze-out propensity is within a favorable range. If a low molecular weight reactive resin according to the prior art (Uvacure 1500) is used in place of the epoxy-functionalized (co)polymer of the invention, the demands on low squeeze-out propensity are not met.

The invention claimed is:

1. A curable reactive adhesive system present on a substrate, and forming a reactive adhesive tape, the system comprising a polymer formed from a free-radical polymerization comprising one or more (meth)acrylate monomers, and optionally one or more vinylic comonomers,
    where the said polymer has a weight-average molar mass Mw of at least 5,000 g/mol and at most 200,000 g/mol in which at least one of the (meth)acrylate monomers has been functionalized with at least one epoxy group to form epoxy-functionalized monomer(s), wherein all or some of the oxygen atoms in the at least one epoxy group bridges either an aliphatic C—C bond in at least one of the epoxy functionalized monomer(s), or a C—C bond that is part of an aliphatic hydrocarbon ring that is optionally hetero-substituted,
    and,
    the proportion of the epoxy functionalized monomer(s) is at least 30% by weight based on the total weight of all (meth)acrylic monomers and vinylic comonomers of the polymer, and the polymer's glass transition temperature in an uncured state is above 0° C. and below 120° C. and, the glass transition temperature of the polymer in its cured state is at least 40° C. higher than that of the polymer in its uncured state,
    and further wherein,
    the curable reactive adhesive system, when provided as a layer having diameter of 21 mm and a thickness of 100 microns between a circular polycarbonate substrate having a thickness of 1 mm and a diameter of 21 mm, and an anodized aluminum substrate having a thickness of 3 mm, the layer being prelaminated to the polycarbonate substrate at 70° C. for not in excess of 30 seconds, and when the polycarbonate substrate with the prelaminated layer is compressed against the aluminum substrate at 180° C., for 12 seconds at a pressure of 10 bar, the radial squeeze-out of the layer of the curable reactive adhesive system extending radially outwardly from the edge of the circular polycarbonate substrate does not exceed 1.5 mm.

2. The curable reactive adhesive system of claim 1, wherein:
    the weight average molar mass Mw of the polymer is at least 10,000 g/mol.

3. The curable reactive adhesive system of claim 2, wherein:
    the weight average molar mass Mw of the polymer is at most 150,000 g/mol.

4. The curable reactive adhesive system of claim 2, wherein the polymer has a weight average molar mass Mw of at least 20,000 g/mol.

5. The curable reactive adhesive system of claim 2, wherein the polymer has a weight average molar mass Mw of at most 100,000 g/mol.

6. The curable reactive adhesive system of claim 1, wherein:
    at least one of the monomers of the polymer is a hard monomer such that a hypothetical homopolymer formed from the hard monomer, in the molecular weight-independent range, has a glass transition temperature of at least 25° C.

7. The curable reactive adhesive system of claim 6, wherein:
    the hypothetical homopolymer formed from the hard monomer, in the molecular weight-independent range, has a glass transition temperature of at least 50° C.

8. The curable reactive adhesive system of claim 1, wherein:
    at least one of the (meth)acrylic monomers or the vinylic comonomers of the polymer is a soft monomer wherein a hypothetical homopolymer formed from the soft monomer, in the molecular weight-independent range, has a glass transition temperature of less than 25° C.

9. The curable reactive adhesive system of claim 1, wherein in the polymer:
    at least one of the (meth)acrylic monomers or the vinylic comonomer bears one or more other functionalities which is not an epoxy group.

10. The curable reactive adhesive system of claim 9, wherein in the polymer:
    at least one of the other functionalities is a silicon-containing group.

11. The curable reactive adhesive system of claim 9, wherein in the polymer:
the proportion of the monomers bearing one or more other functionalities which is not an epoxy group is up to 10% by weight, based upon the total weight of all (meth)acrylic monomers and vinylic comonomers of the polymer.

12. The curable reactive adhesive system of claim 1, further comprising at least one initiator for a curing reaction involving the polymer.

13. The curable reactive adhesive system of claim 12, wherein:
the glass transition temperature of the polymer in an uncured state is from about 32° C. to about 38° C.

14. The curable reactive adhesive system of claim 12, wherein:
the glass transition temperature of the polymer in a cured state is from about 68° C. to about 72° C.

15. The curable reactive adhesive system of claim 1, wherein:
the polymer's glass transition temperature in its uncured state is above 25° C.

16. The curable reactive adhesive system of claim 1, wherein the polymer's glass transition temperature in its cured state is below 100° C.

17. The curable reactive adhesive system of claim 1, wherein in the polymer, at least 50% by weight of the at least one of the (meth)acrylate monomers functionalized with at least one epoxy group are those comprising an aliphatic hydrocarbon ring having a C—C bond bridged by an epoxy group, which aliphatic hydrocarbon ring has been optionally hetero-substituted.

18. The curable reactive adhesive system of claim 1, wherein in the polymer, the proportion of the epoxy functionalized monomer(s) is more than 50% by weight based on the total weight of all (meth)acrylic monomers of the polymer.

19. The curable reactive adhesive system of claim 1, wherein, in the at least one of the (meth)acrylate monomers has been functionalized with at least one epoxy group to form epoxy-functionalized monomer(s), the proportion of the epoxy functionalized monomer(s) is at least 50% by weight based on the total weight of all (meth)acrylic monomers and vinylic comonomers of the polymer.

* * * * *